United States Patent
Yamashita et al.

(10) Patent No.: US 9,903,601 B2
(45) Date of Patent: Feb. 27, 2018

(54) AIR-CONDITIONING APPARATUS

(75) Inventors: Koji Yamashita, Tokyo (JP); Hiroyuki Morimoto, Tokyo (JP); Yuji Motomura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 911 days.

(21) Appl. No.: 13/496,824

(22) PCT Filed: Oct. 27, 2009

(86) PCT No.: PCT/JP2009/068416
§ 371 (c)(1),
(2), (4) Date: Mar. 16, 2012

(87) PCT Pub. No.: WO2011/052040
PCT Pub. Date: May 5, 2011

(65) Prior Publication Data
US 2012/0174611 A1    Jul. 12, 2012

(51) Int. Cl.
*F24F 3/00* (2006.01)
*F25B 41/04* (2006.01)
(Continued)

(52) U.S. Cl.
CPC ............ *F24F 3/065* (2013.01); *F25B 25/005* (2013.01); *F24F 2011/0082* (2013.01);
(Continued)

(58) Field of Classification Search
CPC ...... F24F 3/065; Y02B 30/745; F25B 25/005; F25B 2700/2106; F25B 2313/0314;
(Continued)

(56) References Cited

U.S. PATENT DOCUMENTS 4,771,610 A * 9/1988 Nakashima ............... F25B 5/00
62/160
4,926,652 A * 5/1990 Kitamoto .................. F25B 5/02
62/175
(Continued)

FOREIGN PATENT DOCUMENTS

CN   101065622 A   10/2007
CN   101276226 A   10/2008
(Continued)

OTHER PUBLICATIONS

English translation of JP 03017475.*
(Continued)

*Primary Examiner* — Kun Kai Ma
(74) *Attorney, Agent, or Firm* — Buchanan Ingersoll & Rooney PC

(57) ABSTRACT

To provide an air-conditioning apparatus capable of achieving energy saving, a pump control of controlling the operating capacity of a pump is performed such that an opening degree of a heat medium flow control device, controlled by a heat-medium-flow-control-device control, approaches a target opening degree, and a refrigeration cycle of a refrigerant circuit is controlled such that the temperature of a heat medium, whose flow rate is controlled by the heat-medium-flow-control-device control and the pump control, approaches a target temperature.

18 Claims, 14 Drawing Sheets

(51) Int. Cl.
| | |
|---|---|
| *F25B 25/00* | (2006.01) |
| *F24F 3/06* | (2006.01) |
| *F24F 11/00* | (2018.01) |
| *F25B 13/00* | (2006.01) |

(52) U.S. Cl.
CPC ......... *F25B 13/00* (2013.01); *F25B 2313/006* (2013.01); *F25B 2313/0231* (2013.01); *F25B 2313/0272* (2013.01); *F25B 2313/02732* (2013.01); *F25B 2313/02741* (2013.01); *F25B 2313/0314* (2013.01); *F25B 2600/13* (2013.01); *F25B 2700/21* (2013.01); *F25B 2700/2106* (2013.01); *Y02B 30/745* (2013.01)

(58) Field of Classification Search
CPC ...... F25B 2313/02741; F25B 2313/006; F25B 2313/0272; F25B 2011/0082; F25B 2600/13; F25B 2700/21; F25B 2313/02732
USPC ....... 62/185, 201, 228.1, 159, 200, 204, 175
See application file for complete search history.

(56) References Cited

U.S. PATENT DOCUMENTS

| | | | | |
|---|---|---|---|---|
| 5,263,333 | A * | 11/1993 | Kubo et al. ...................... | 62/160 |
| 5,752,654 | A * | 5/1998 | Mowery, Sr. ...... | G05D 23/1917 236/91 D |
| 5,907,956 | A * | 6/1999 | Arima et al. .................... | 62/148 |
| 6,192,696 | B1 * | 2/2001 | Shimamoto et al. ........... | 62/209 |
| 6,347,528 | B1 * | 2/2002 | Iritani ................ | B60H 1/00357 62/323.1 |
| 6,666,042 | B1 * | 12/2003 | Cline ...................... | F25D 17/02 62/175 |
| 2003/0101739 | A1 * | 6/2003 | Moon et al. .................. | 62/228.1 |
| 2005/0274814 | A1 * | 12/2005 | Schwartz ........... | B60H 1/00392 237/28 |
| 2006/0032623 | A1 * | 2/2006 | Tsubone ............. | B60H 1/00492 165/202 |
| 2006/0191286 | A1 * | 8/2006 | Park et al. ....................... | 62/434 |
| 2007/0107255 | A1 * | 5/2007 | Tamura et al. ................. | 34/475 |
| 2008/0053115 | A1 * | 3/2008 | Trantham ........................ | 62/118 |
| 2008/0156014 | A1 * | 7/2008 | Kopko et al. ................... | 62/314 |
| 2009/0013700 | A1 * | 1/2009 | Unezaki et al. .................. | 62/77 |
| 2009/0171512 | A1 * | 7/2009 | Duncan ................ | F24F 5/0035 700/300 |
| 2011/0036110 | A1 * | 2/2011 | Fujimoto ................... | F24D 3/18 62/149 |
| 2011/0088421 | A1 * | 4/2011 | Wakamoto .............. | F25B 13/00 62/238.7 |
| 2011/0146339 | A1 * | 6/2011 | Yamashita ................ | F24F 3/06 62/513 |
| 2011/0185756 | A1 * | 8/2011 | Yamashita ................ | F24F 3/06 62/171 |
| 2012/0006050 | A1 * | 1/2012 | Takayama ............... | F24F 3/065 62/513 |
| 2012/0012285 | A1 * | 1/2012 | Okamoto ................ | F24F 3/153 165/110 |
| 2012/0042674 | A1 * | 2/2012 | Takenaka .................. | F24F 3/06 62/180 |

FOREIGN PATENT DOCUMENTS

| | | | |
|---|---|---|---|
| EP | 0 069 996 | A1 | 1/1983 |
| JP | 03195851 | A * | 8/1991 |
| JP | 04-165242 | A | 6/1992 |
| JP | 05-280818 | A | 10/1993 |
| JP | 2001-289465 | A | 10/2001 |
| JP | 2002-106995 | A | 4/2002 |
| JP | 2003-343936 | A | 12/2003 |
| JP | 2003343936 | A * | 12/2003 |
| JP | 2005-140444 | A | 6/2005 |
| JP | 2007-315695 | A | 12/2007 |
| JP | 2008-224182 | A | 9/2008 |
| JP | 2008-309428 | A | 12/2008 |
| WO | WO 2006/057111 | * | 1/2006 |

OTHER PUBLICATIONS

International Search Report (PCT/ISA/210) dated Feb. 2, 2010, by Japanese Patent Office as the International Searching Authority for International Application No. PCT/JP2009/068416.

Office Action (Notice of Reasons for Rejection) dated Apr. 23, 2013, issued in corresponding Japanese Patent Application No. 2011-538141, and an English Translation of the Office Action. (5 pages).

Office Action dated Jan. 30, 2014, issued by the Chinese Patent Office in corresponding Chinese Patent Application No. 200980162181.5, and English language translation of Office Action. (26 pages).

Extended European Search Report dated Feb. 13, 2015 by the European Patent Office in corresponding European Patent Application No. 09850820.3.

* cited by examiner

Tmr: CONTROL TARGET VALUE (FOR EXAMPLE, 5 DEGREES C)
Trs: RANGE OF STABILITY (FOR EXAMPLE, 1 DEGREE C)

FIG. 10

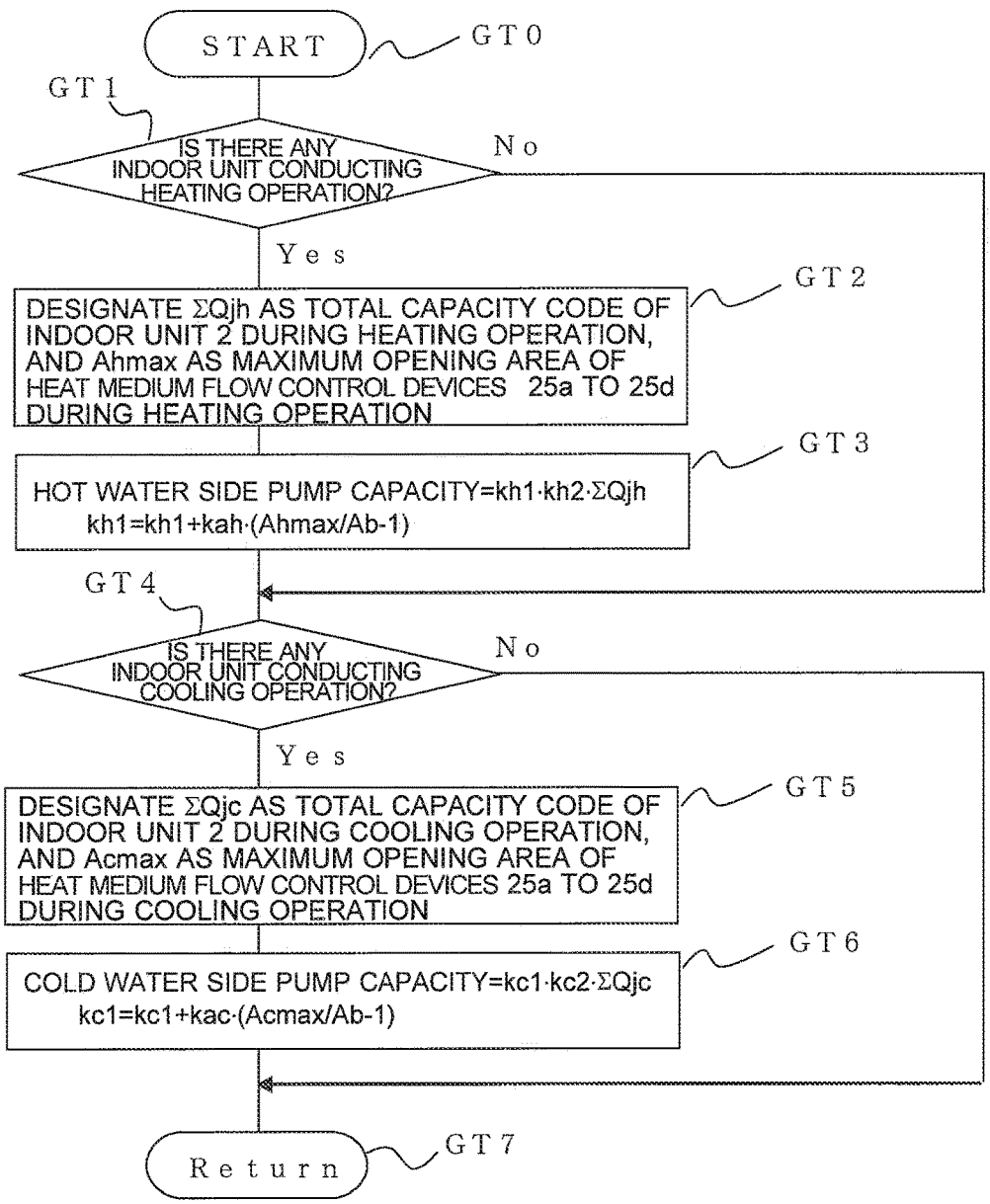

kah, kac: RELAXATION COEFFICIENT (FOR EXAMPLE, 0.3)
kh2: COEFFICIENT THAT CONVERTS CAPACITY CODE OF INDOOR UNIT
   2 TO HEATING SIDE PUMP CAPACITY
kc2: COEFFICIENT THAT CONVERTS CAPACITY CODE OF INDOOR UNIT
   2 TO COOLING SIDE PUMP CAPACITY
Ab: OPENING AREA CORRESPONDING TO TARGET OPENING DEGREE
   OF HEAT MEDIUM FLOW CONTROL DEVICES 25a TO 25d, FOR EXAMPLE,
   OPENING AREA OF OPENING DEGREE CORRESPONDING TO 85% OF
   FULL OPENING DEGREE

FIG. 11

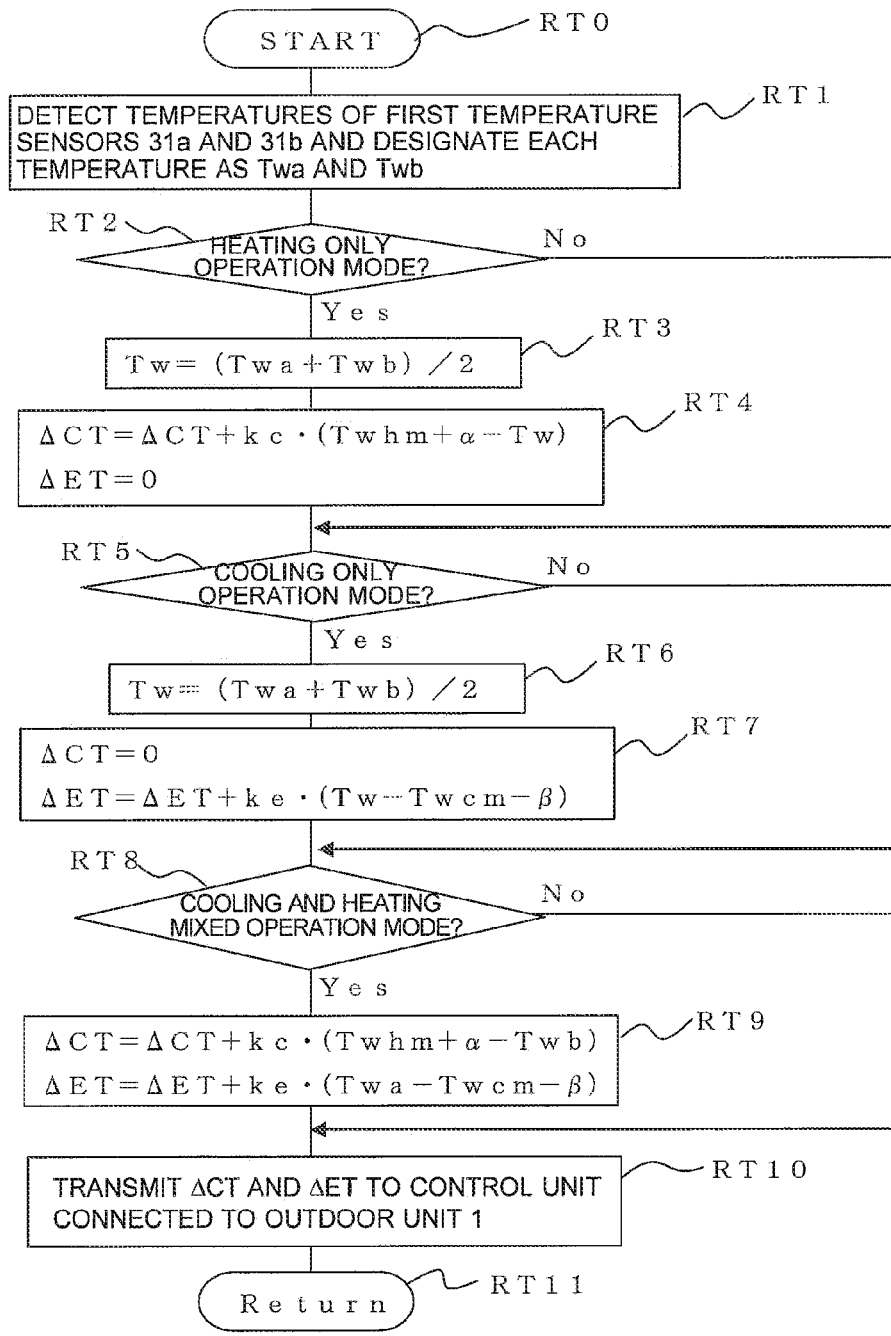

ΔET, ΔCT: AMOUNT OF CHANGE OF EVAPORATING TEMPERATURE TARGET VALUE, AMOUNT OF CHANGE OF CONDENSING TEMPERATURE TARGET VALUE
Twa, Twb: DETECTION TEMPERATURES OF FIRST TEMPERATURE SENSORS 31a AND 31b
Tw: MEAN TEMPERATURE BETWEEN Twa AND Twb
Twhm, Twcm: HOT WATER SIDE TARGET TEMPERATURE, COLD WATER SIDE TARGET TEMPERATURE
ke, kc: RELAXATION COEFFICIENT (FOR EXAMPLE, 0.3)
α, β: AMOUNT OF HEAT REJECTION FROM EXTENSION PIPE OF HOT WATER SIDE, AMOUNT OF HEAT ABSORPTION OF EXTENSION PIPE OF COLD WATER SIDE (FOR EXAMPLE, 1 DEGREE C)

AIR-CONDITIONING APPARATUS

TECHNICAL FIELD

The present invention relates to an air-conditioning apparatus, which is applied to, for example, a multi-air-conditioning apparatus for a building.

BACKGROUND ART

In an air-conditioning apparatus such as a multi-air-conditioning apparatus for a building, a refrigerant is circulated between an outdoor unit, which is a heat source unit disposed, for example, outside a building, and indoor units disposed in rooms in the building. The refrigerant transfers heat or removes heat to heat or cool air, thus heating or cooling a conditioned space through the heated or cooled air. Hydrofluorocarbon (HFC) refrigerants are often used as the refrigerant, for example. An air-conditioning apparatus using a natural refrigerant, such as carbon dioxide ($CO_2$), has also been proposed.

Furthermore, in an air-conditioning apparatus called a chiller, cooling energy or heating energy is generated in a heat source unit disposed outside a structure. Water, antifreeze, or the like is heated or cooled by a heat exchanger disposed in an outdoor unit and it is carried to an indoor unit, such as a fan coil unit or a panel heater, to perform heating or cooling (refer to Patent Literature 1, for example).

Moreover, there is an air-conditioning apparatus called a heat recovery chiller that connects a heat source unit to each indoor unit with four water pipes arranged therebetween, supplies cooled and heated water or the like simultaneously, and allows the cooling and heating in the indoor units to be selected freely (refer to Patent Literature 2, for example).

In addition, there is an air-conditioning apparatus that disposes a heat exchanger for a primary refrigerant and a secondary refrigerant near each indoor unit in which the secondary refrigerant is carried to the indoor unit (refer to Patent Literature 3, for example).

Furthermore, there is an air-conditioning apparatus that connects an outdoor unit to each branch unit including a heat exchanger with two pipes in which a secondary refrigerant is carried to an indoor unit (refer to Patent Literature 4, for example).

CITATION LIST

Patent Literature

Patent Literature 1: Japanese Unexamined Patent Application Publication No. 2005-140444 (page 4, FIG. 1, etc.)
Patent Literature 2: Japanese Unexamined Patent Application Publication No. 5-280818 (pages 4 and 5, FIG. 1, etc.)
Patent Literature 3: Japanese Unexamined Patent Application Publication No. 2001-289465 (pages 5 to 8, FIG. 1, FIG. 2, etc.)
Patent Literature 4: Japanese Unexamined Patent Application Publication No. 2003-343936 (page 5, FIG. 1)

SUMMARY OF INVENTION

Technical Problem

In an air-conditioning apparatus of a related art, such as a multi-air-conditioning apparatus for a building, there is a possibility of refrigerant leakage to, for example, an indoor space because the refrigerant is circulated to an indoor unit. On the other hand, in the air-conditioning apparatus disclosed in Patent Literature 1 and Patent Literature 2, the refrigerant does not pass through the indoor unit. However, in the air-conditioning apparatus disclosed in Patent Literature 1 and Patent Literature 2, the heat medium needs to be heated or cooled in a heat source unit disposed outside a structure, and needs to be carried to the indoor unit side. Accordingly, a circulation path of the heat medium is long. In this case, carrying of heat for a predetermined heating or cooling work using the heat medium consumes more amount of energy, in the form of conveyance power and the like, than the amount of energy consumed by the refrigerant. As the circulation path becomes longer, therefore, the conveyance power becomes markedly large. This indicates that energy saving can be achieved in an air-conditioning apparatus if the circulation of the heat medium can be controlled well.

In the air-conditioning apparatus disclosed in Patent Literature 2, the four pipes connecting the outdoor side and the indoor need to be arranged in order to allow cooling or heating to be selected in each indoor unit. Disadvantageously, there is little ease of construction. In the air-conditioning apparatus disclosed in Patent Literature 3, secondary medium circulating devices such as a pump needs to be provided to each indoor unit. Disadvantageously, the system is not only costly but also has large noise, and is not practical. In addition, since the heat exchanger is disposed near each indoor unit, the risk of refrigerant leakage to a place near an indoor space cannot be eliminated.

In the air-conditioning apparatus disclosed in Patent Literature 4, a primary refrigerant that has exchanged heat flows into the same passage as that of the primary refrigerant before heat exchange. Accordingly, when a plurality of indoor units is connected, it is difficult for each indoor unit to exhibit its maximum capacity. Such a configuration wastes energy. Furthermore, each branch unit is connected to an extension pipe with a total of four pipes, two for cooling and two for heating. This configuration is consequently similar to that of a system in which the outdoor unit is connected to each branching unit with four pipes. Accordingly, there is little ease of construction in such a system.

The present invention has been made to overcome the above-described problem and provides an air-conditioning apparatus capable of achieving energy saving. The invention further provides an air-conditioning apparatus capable of achieving improvement of safety by not allowing refrigerant to circulate in or near an indoor unit. The invention further provides an air-conditioning apparatus that reduces the number of pipes connecting an outdoor unit to a branch unit (heat medium relay unit) or the branch unit to an indoor unit, and improves ease of construction as well as improving energy efficiency.

Solution to Problem

An air-conditioning apparatus according to the present invention includes a compressor, a heat source side heat exchanger, a plurality of expansion device, a plurality of heat exchangers related to heat medium, a plurality of pumps, and a plurality of use side heat exchangers. The compressor, the heat source side heat exchanger, the expansion devices, and the heat exchangers related to heat medium connect to form a refrigerant cycle circulating a heat source side refrigerant. The pumps, the use side heat exchangers, and the heat exchangers related to heat medium connect to form a plurality of heat medium cycle circulating a heat medium. The air-conditioning apparatus comprises a heat medium flow control device controlling a flow rate of the heat medium that circulates in the use side heat exchangers, a first temperature sensor, which is positioned at a point in a passage between each of the heat exchangers related to heat medium and an inlet side of the use side heat exchangers, detecting a temperature of the heat medium, a second temperature sensor, which is positioned at a point in a passage between each outlet side of the use side heat exchangers and the heat exchangers related to heat medium, detecting a temperature of the heat medium, and a controller that controls at least the heat medium flow control device, the pumps, the compressor, and the expansion devices. The controller executes a heat-medium-flow-control-device control that controls an opening degree of the heat medium flow control device based on detection temperatures of the first temperature sensor and the second temperature sensor. The controller executes a pump control that controls each operation capacity of the pumps such that the opening degree of the heat medium flow control device controlled by the heat-medium-flow-control-device control approaches a target opening degree. The controller executes a control of the refrigeration cycle of the refrigerant circuit such that a temperature of the heat medium, in which the flow rate is controlled by the heat-medium-flow-control-device control and the pump control, approaches a target temperature.

Advantageous Effects of Invention

The present invention is capable of shortening the pipes in which the heat medium circulates and requires small conveyance power, and thus is capable of saving energy. Furthermore, the invention is capable of setting the opening degree such that the loss in the heat medium flow control device is reduced, as well as approaching the temperature of the heat medium to a target temperature.

BRIEF DESCRIPTION OF DRAWINGS

FIG. 10 is a flowchart illustrating a control of a pump of the air-conditioning apparatus according to Embodiment of the invention.

FIG. 11 is a flowchart illustrating a control of a condensing temperature and an evaporating temperature of a refrigerating cycle of the air-conditioning apparatus according to Embodiment of the invention.

DESCRIPTION OF EMBODIMENT

Embodiment of the invention will be described below with reference to the drawings.

Figure 1:
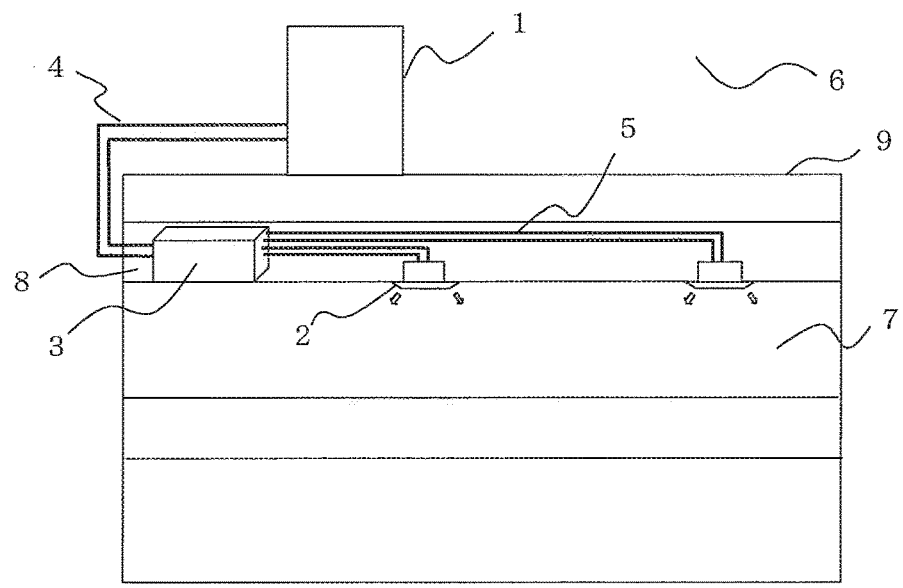
FIG. 1 is a schematic diagram illustrating an exemplary installation of an air-conditioning apparatus according to Embodiment of the invention.
Figure 2:
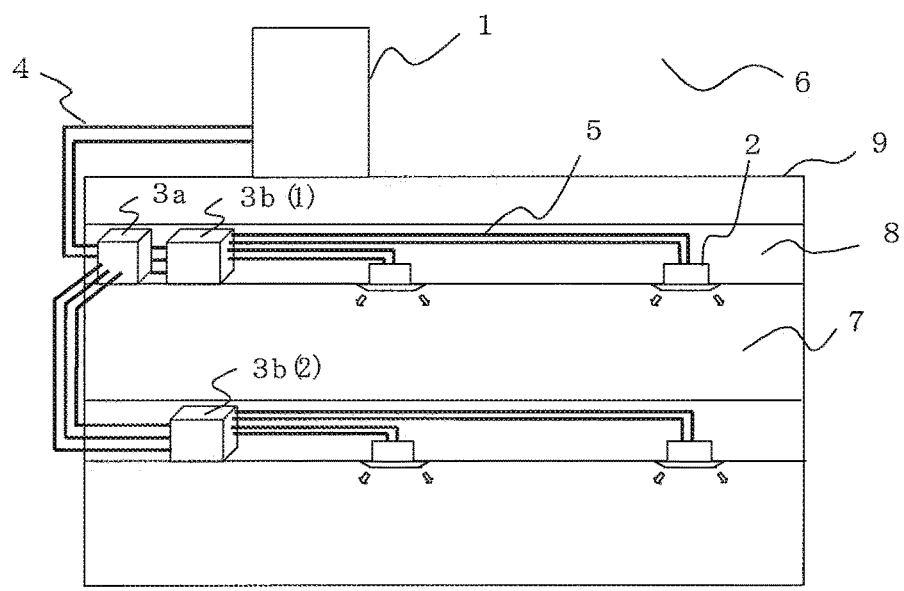
FIG. 2 is a schematic diagram illustrating an exemplary installation of an air-conditioning apparatus according to Embodiment of the invention.

FIGS. 1 and 2 are schematic diagrams illustrating exemplary installations of the air-conditioning apparatus according to Embodiment of the invention. The exemplary installations of the air-conditioning apparatus will be described with reference to FIGS. 1 and 2. This air-conditioning apparatus uses refrigeration cycles (a refrigerant cycle A and a heat medium cycle B) in which refrigerants (a heat source side refrigerant or a heat medium) circulate such that a cooling mode or a heating mode can be freely selected as its operation mode in each indoor unit. It should be noted that the dimensional relationships of components in FIG. 1 and other subsequent figures may be different from the actual ones.

Referring to FIG. 1, the air-conditioning apparatus according to Embodiment includes a single outdoor unit 1, functioning as a heat source unit, a plurality of indoor units 2, and a heat medium relay unit 3 disposed between the outdoor unit 1 and the indoor units 2. The heat medium relay unit 3 exchanges heat between the heat source side refrigerant and the heat medium. The outdoor unit 1 and the heat medium relay unit 3 are connected with refrigerant pipes 4 through which the heat source side refrigerant flows. The heat medium relay unit 3 and each indoor unit 2 are connected with pipes (heat medium pipes) through which the heat medium flows. Cooling energy or heating energy generated in the outdoor unit 1 is delivered through the heat medium relay unit 3 to the indoor units 2.

Referring to FIG. 2, the air-conditioning apparatus according to Embodiment includes a single outdoor unit 1, a plurality of indoor units 2, a plurality of separated heat medium relay units 3 (a main heat medium relay unit 3a and sub heat medium relay units 3b) disposed between the outdoor unit 1 and the indoor units 2. The outdoor unit 1 and the main heat medium relay unit 3a are connected with the refrigerant pipes 4. The main heat medium relay unit 3a and the sub heat medium relay units 3b are connected with the refrigerant pipes 4. Each sub heat medium relay unit 3b and each indoor unit 2 are connected with the pipes 5. Cooling energy or heating energy generated in the outdoor unit 1 is delivered through the main heat medium relay unit 3a and the sub heat medium relay units 3b to the indoor units 2.

The outdoor unit 1 is typically disposed in an outdoor space 6 that is a space (e.g., a roof) outside a structure 9, such as a building, and is configured to supply cooling energy or heating energy through the heat medium relay unit 3 to the indoor units 2. Each indoor unit 2 is disposed at a position that can supply cooling air or heating air to an indoor space 7, which is a space (e.g., a living room) inside the structure 9, and supplies the cooling air or heating air to the indoor space 7, that is, to a conditioned space. The heat medium relay unit 3 is configured with a housing separate from the outdoor unit 1 and the indoor units 2 such that the heat medium relay unit 3 can be disposed at a position different from those of the outdoor space 6 and the indoor space 7, and is connected to the outdoor unit 1 through the refrigerant pipes 4 and is connected to the indoor units 2 through the pipes 5 to convey cooling energy or heating energy, supplied from the outdoor unit 1 to the indoor units 2.

As illustrated in FIGS. 1 and 2, in the air-conditioning apparatus according to Embodiment, the outdoor unit 1 is connected to the heat medium relay unit 3 using two refrigerant pipes 4, and the heat medium relay unit 3 is connected to each indoor unit 2 using two pipes 5. As described above, in the air-conditioning apparatus according to Embodiment, each of the units (the outdoor unit 1, the indoor units 2, and the heat medium relay unit 3) is connected using two pipes (the refrigerant pipes 4 or the pipes 5), thus construction is facilitated.

As illustrated in FIG. 2, the heat medium relay unit 3 can be separated into a single main heat medium relay unit 3a and two sub heat medium relay units 3b (a sub heat medium relay unit 3b(1) and a sub heat medium relay unit 3b(2)) derived from the main heat medium relay unit 3a. This separation allows a plurality of sub heat medium relay units 3b to be connected to the single main heat medium relay unit 3a. In this configuration, the number of refrigerant pipes 4 connecting the main heat medium relay unit 3a to each sub heat medium relay unit 3b is three. Detail of this circuit will be described in detail later (refer to FIG. 3A).

Furthermore, FIGS. 1 and 2 illustrate a state where each heat medium relay unit 3 is disposed in the structure 9 but in a space different from the indoor space 7, for example, a space above a ceiling (hereinafter, simply referred to as a "space 8"). The heat medium relay unit 3 can be disposed in other spaces, e.g., a common space where an elevator or the like is installed. In addition, although FIGS. 1 and 2 illustrate a case in which the indoor units 2 are of a ceiling-mounted cassette type, the indoor units are not limited to this type and, for example, a ceiling-concealed type, a ceiling-suspended type, or any type of indoor unit may be used as long as the unit can blow out heating air or cooling air into the indoor space 7 directly or through a duct or the like.

FIGS. 1 and 2 illustrate the case in which the outdoor unit 1 is disposed in the outdoor space 6. The arrangement is not limited to this case. For example, the outdoor unit 1 may be disposed in an enclosed space, for example, a machine room with a ventilation opening, may be disposed inside the structure 9 as long as waste heat can be exhausted through an exhaust duct to the outside of the structure 9, or may be disposed inside the structure 9 when the used outdoor unit 1 is of a water-cooled type. Even when the outdoor unit 1 is disposed in such a place, no problem in particular will occur.

Furthermore, the heat medium relay unit 3 can be disposed near the outdoor unit 1. It should be noted that when the distance from the heat medium relay unit 3 to the indoor unit 2 is excessively long, because power for conveying the heat medium is significantly large, the advantageous effect of energy saving is reduced. Additionally, the numbers of connected outdoor units 1, indoor units 2, and heat medium relay units 3 are not limited to those illustrated in FIGS. 1 and 2. The numbers thereof can be determined in accordance with the structure 9 where the air-conditioning apparatus according to Embodiment is installed.

Figure 3:
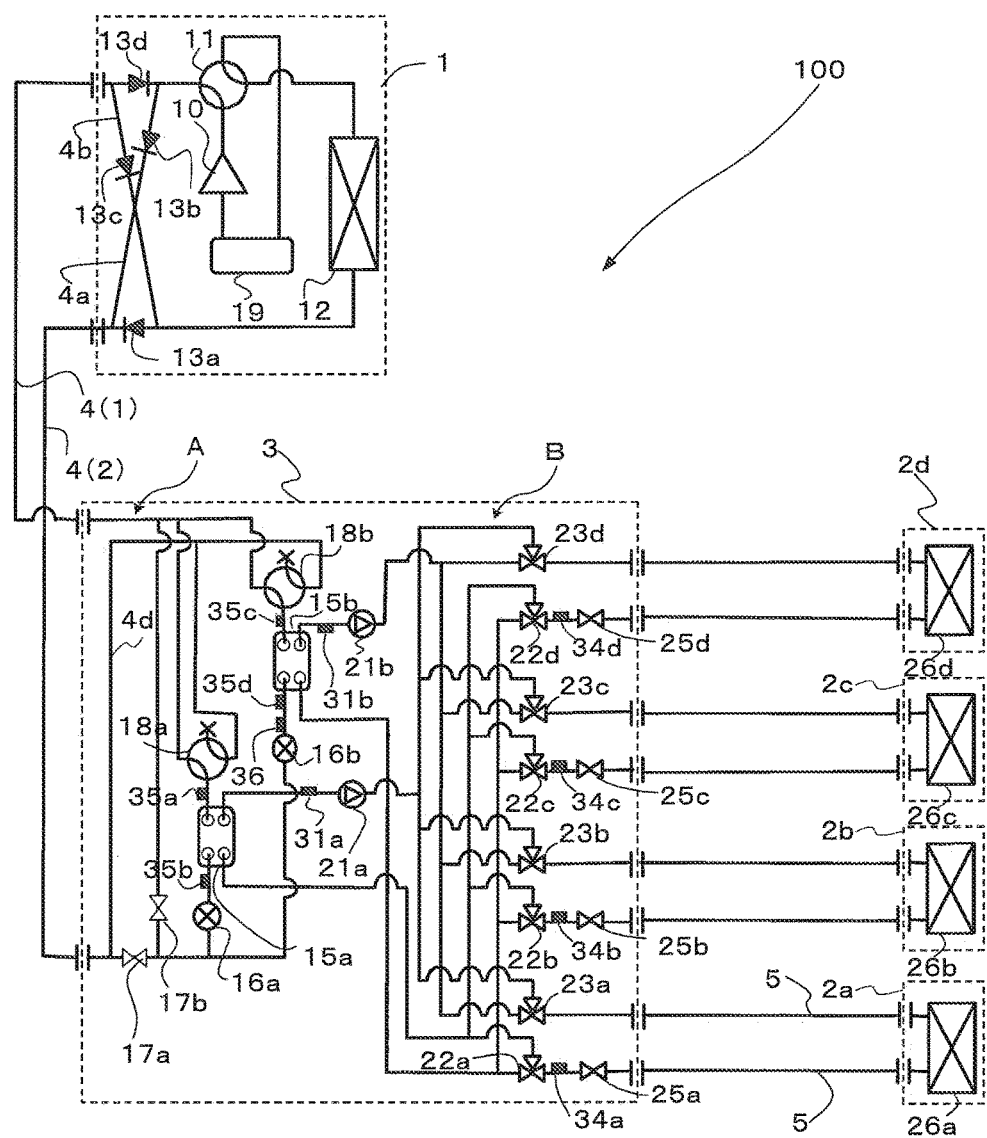
FIG. 3 is a schematic circuit diagram illustrating an exemplary circuit configuration of the air-conditioning apparatus according to Embodiment of the invention.

FIG. 3 is a schematic circuit diagram illustrating an exemplary circuit configuration of the air-conditioning apparatus (hereinafter, referred to as an "air-conditioning apparatus 100") according to Embodiment of the invention. The detailed configuration of the air-conditioning apparatus 100 will be described with reference to FIG. 3. As illustrated in FIG. 3, the outdoor unit 1 and the heat medium relay unit 3 are connected with the refrigerant pipes 4 through heat exchangers related to heat medium 15a and 15b included in the heat medium relay unit 3. Furthermore, the heat medium relay unit 3 and the indoor unit 2 are connected with the pipes 5 through the heat exchangers related to heat medium 15a and 15b.

[Outdoor Unit 1]

The outdoor unit 1 includes a compressor 10, a first refrigerant flow switching device 11, such as a four-way valve, a heat source side heat exchanger 12, and an accumulator 19, which are connected in series with the refrigerant pipes 4. The outdoor unit 1 further includes a first connecting pipe 4a, a second connecting pipe 4b, a check valve 13a, a check valve 13b, a check valve 13c, and a check valve 13d. By providing the first connecting pipe 4a, the second connecting pipe 4b, the check valve 13a, the check valve 13b, the check valve 13c, and the check valve 13d, the heat source side refrigerant can be made to flow into the heat medium relay unit 3 in a constant direction irrespective of the operation requested by any indoor unit 2.

The compressor 10 sucks the heat source side refrigerant and compress the heat source side refrigerant to a high-temperature, high-pressure state. The compressor 10 may include, for example, a capacity-controllable inverter compressor. The first refrigerant flow switching device 11 switches the flow of the heat source side refrigerant between a heating operation (heating only operation mode and heating main operation mode) and a cooling operation (cooling only operation mode and cooling main operation mode). The heat source side heat exchanger 12 functions as an evaporator in the heating operation, functions as a condenser (or a radiator) in the cooling operation, exchanges heat between air supplied from the air-sending device, such as a fan (not illustrated), and the heat source side refrigerant, and evaporate and gasify or condense and liquefy the heat source side refrigerant. The accumulator 19 is disposed on the suction side of the compressor 10 and stores excess refrigerant.

The check valve 13d is provided in the refrigerant pipe 4 between the heat medium relay unit 3 and the first refrigerant flow switching device 11 and permits the heat source side refrigerant to flow only in a predetermined direction (the direction from the heat medium relay unit 3 to the outdoor unit 1). The check valve 13a is provided in the refrigerant pipe 4 between the heat source side heat exchanger 12 and the heat medium relay unit 3 and allows the heat source side refrigerant to flow only in a predetermined direction (the direction from the outdoor unit 1 to the heat medium relay unit 3). The check valve 13*b* is provided in the first connecting pipe 4*a* and allows the heat source side refrigerant discharged from the compressor 10 to flow through the heat medium relay unit 3 during the heating operation. The check valve 13*c* is disposed in the second connecting pipe 4*b* and allows the heat source side refrigerant, returning from the heat medium relay unit 3 to flow to the suction side of the compressor 10 during the heating operation.

The first connecting pipe 4*a* connects the refrigerant pipe 4, between the first refrigerant flow switching device 11 and the check valve 13*d*, to the refrigerant pipe 4, between the check valve 13*a* and the heat medium relay unit 3, in the outdoor unit 1. The second connecting pipe 4*b* is configured to connect the refrigerant pipe 4, between the check valve 13*d* and the heat medium relay unit 3, to the refrigerant pipe 4, between the heat source side heat exchanger 12 and the check valve 13*a*, in the outdoor unit 1. It should be noted that FIG. 3 illustrates a case in which the first connecting pipe 4*a*, the second connecting pipe 4*b*, the check valve 13*a*, the check valve 13*b*, the check valve 13*c*, and the check valve 13*d* are disposed, but the device is not limited to this case, and they may be omitted.

[Indoor Units 2]

The indoor units 2 each include a use side heat exchanger 26. The use side heat exchanger 26 is connected to a heat medium flow control device 25 and a second heat medium flow switching device 23 in the heat medium relay unit 3 with the pipes 5. Each of the use side heat exchanger 26 exchanges heat between air supplied from an air-sending device, such as a fan, (not illustrated) and the heat medium in order to produce heating air or cooling air to be supplied to the indoor space 7.

FIG. 3 illustrates a case in which four indoor units 2 are connected to the heat medium relay unit 3. Illustrated are, from the bottom of the drawing, an indoor unit 2*a*, an indoor unit 2*b*, an indoor unit 2*c*, and an indoor unit 2*d*. In addition, the use side heat exchangers 26 are illustrated as, from the bottom of the drawing, a use side heat exchanger 26*a*, a use side heat exchanger 26*b*, a use side heat exchanger 26*c*, and a use side heat exchanger 26*d* each corresponding to the indoor units 2*a* to 2*d*. As is the case of FIGS. 1 and 2, the number of connected indoor units 2 illustrated in FIG. 3 is not limited to four.

[Heat Medium Relay Unit 3]

The heat medium relay unit 3 includes the two heat exchangers related to heat medium 15, two expansion devices 16, two on-off devices 17, two second refrigerant flow switching devices 18, two pumps 21, four first heat medium flow switching devices 22, the four second heat medium flow switching devices 23, and the four heat medium flow control devices 25. An air-conditioning apparatus in which the heat medium relay unit 3 is separated into the main heat medium relay unit 3*a* and the sub heat medium relay unit 3*b* will be described later with reference to FIG. 3A.

Each of the two heat exchangers related to heat medium 15 (the heat exchanger related to heat medium 15*a* and the heat exchanger related to heat medium 15*b*) functions as a condenser (radiator) or an evaporator and exchanges heat between the heat source side refrigerant and the heat medium in order to transfer cooling energy or heating energy, generated in the outdoor unit 1 and stored in the heat source side refrigerant, to the heat medium. The heat exchanger related to heat medium 15*a* is disposed between an expansion device 16*a* and a second refrigerant flow switching device 18*a* in a refrigerant cycle A and is used to heat the heat medium in the heating only operation mode and is used to cool the heat medium in the cooling only operation mode, the cooling main operation mode, and the heating main operation mode. The heat exchanger related to heat medium 15*a* is disposed between an expansion device 16*a* and a second refrigerant flow switching device 18*a* in a refrigerant cycle A and is used to heat the heat medium in the heating only operation mode and is used to cool the heat medium in the cooling only operation mode, the cooling main operation mode, and the heating main operation mode.

The two expansion devices 16 (the expansion device 16*a* and the expansion device 16*b*) each have functions of a reducing valve and an expansion valve and are configured to reduce the pressure of and expand the heat source side refrigerant. The expansion device 16*a* is disposed upstream of the heat exchanger related to heat medium 15*a*, upstream regarding the heat source side refrigerant flow during the cooling operation. The expansion device 16*b* is disposed upstream of the heat exchanger related to heat medium 15*b*, upstream regarding the heat source side refrigerant flow during the cooling operation. Each of the two expansion devices 16 may include a component having a variably controllable opening degree, e.g., an electronic expansion valve.

The two on-off devices 17 (an on-off device 17*a* and an on-off device 17*b*) each include, for example, a two-way valve and open or close the refrigerant pipe 4. The on-off device 17*a* is disposed in the refrigerant pipe 4 on the inlet side of the heat source side refrigerant. The on-off device 17*b* is disposed in a pipe connecting the refrigerant pipe 4 on the inlet side of the heat source side refrigerant and the refrigerant pipe 4 on an outlet side thereof. The two second refrigerant flow switching devices 18 (second refrigerant flow switching devices 18*a* and 18*b*) each include, for example, a four-way valve and switch passages of the heat source side refrigerant in accordance with the operation mode. The second refrigerant flow switching device 18*a* is disposed downstream of the heat exchanger related to heat medium 15*a*, downstream regarding the heat source side refrigerant flow during the cooling operation. The second refrigerant flow switching device 18*b* is disposed downstream of the heat exchanger related to heat medium 15*b*, downstream regarding the heat source side refrigerant flow during the cooling only operation.

The two pumps 21 (pump 21*a* and pump 21*b*), serving as heat medium sending devices, circulate the heat medium flowing through the pipe 5. The pump 21*a* is disposed in the pipe 5 between the heat exchanger related to heat medium 15*a* and the second heat medium flow switching devices 23. The pump 21*b* is disposed in the pipe 5 between the heat exchanger related to heat medium 15*b* and the second heat medium flow switching devices 23. Each of the two pumps 21 may include, for example, a capacity-controllable pump. Note that the pump 21*a* may be provided in the pipe 5 between the heat exchanger related to heat medium 15*a* and the first heat medium flow switching devices 22. Furthermore, the pump 21*b* may be provided in the pipe 5 between the heat exchanger related to heat medium 15*b* and the first heat medium flow switching devices 22.

The four first heat medium flow switching devices 22 (first heat medium flow switching devices 22*a* to 22*d*) each include a three-way valve or the like and switch passages of the heat medium. The first heat medium flow switching devices 22 are arranged so that the number thereof (four in this case) corresponds to the installed number of indoor units 1. Each first heat medium flow switching device 22 is disposed on an outlet side of a heat medium passage of the corresponding use side heat exchanger 26 such that one of the three ways is connected to the heat exchanger related to heat medium 15a, another one of the three ways is connected to the heat exchanger related to heat medium 15b, and the other one of the three ways is connected to the heat medium flow control device 25. Furthermore, illustrated from the bottom of the drawing are the first heat medium flow switching device 22a, the first heat medium flow switching device 22b, the first heat medium flow switching device 22c, and the first heat medium flow switching device 22d, so as to correspond to the respective indoor units 2.

The four second heat medium flow switching devices 23 (second heat medium flow switching devices 23a to 23d) each include, for example, a three-way valve and are configured to switch passages of the heat medium. The second heat medium flow switching devices 23 are arranged so that the number thereof (four in this case) corresponds to the installed number of indoor units 2. Each second heat medium flow switching device 23 is disposed on an inlet side of the heat medium passage of the corresponding use side heat exchanger 26 such that one of the three ways is connected to the heat exchanger related to heat medium 15a, another one of the three ways is connected to the heat exchanger related to heat medium 15b, and the other one of the three ways is connected to the use side heat exchanger 26. Furthermore, illustrated from the bottom of the drawing are the second heat medium flow switching device 23a, the second heat medium flow switching device 23b, the second heat medium flow switching device 23c, and the second heat medium flow switching device 23d so as to correspond to the respective indoor units 2.

The four heat medium flow control devices 25 (heat medium flow control devices 25a to 25d) each include, for example, a two-way valve using a stepping motor, for example, and is capable of controlling the area of opening of the pipe 5, which is the flow passage of the heat medium. The heat medium flow control devices 25 are arranged so that the number thereof (four in this case) corresponds to the installed number of indoor units 2. Each heat medium flow control device 25 is disposed on the outlet side of the heat medium passage of the corresponding use side heat exchanger 26 such that one way is connected to the use side heat exchanger 26 and the other way is connected to the first heat medium flow switching device 22. Furthermore, illustrated from the bottom of the drawing are the heat medium flow control device 25a, the heat medium flow control device 25b, the heat medium flow control device 25c, and the heat medium flow control device 25d so as to correspond to the respective indoor units 2.

Note that the Embodiment will describe a case in which each heat medium flow control device 25 is disposed on the outlet side (on the downstream side) of the corresponding use side heat exchanger 26 but the arrangement is not limited to this case. Each heat medium flow control device 25 may be disposed on the inlet side (on the upstream side) of the use side heat exchanger 26 such that one way is connected to the use side heat exchanger 26 and the other way is connected to the second heat medium flow switching device 23.

The heat medium relay unit 3 includes various detecting devices (two first temperature sensors 31, four second temperature sensors 34, four third temperature sensors 35, and a pressure sensor 36). Information (temperature information and pressure information) detected by these detecting devices are transmitted to a controller (not illustrated) that performs integrated control of the operation of the air-conditioning apparatus 100 such that the information is used to control, for example, the driving frequency of the compressor 10, the rotation speed of the air-sending device (not illustrated), switching of the first refrigerant flow switching device 11, the driving frequency of the pumps 21, switching by the second refrigerant flow switching devices 18, and switching of passages of the heat medium.

Each of the two first temperature sensors 31 (a first temperature sensor 31a and a first temperature sensor 31b) detects the temperature of the heat medium flowing out of the heat exchanger related to heat medium 15, namely, the heat medium at an outlet of the heat exchanger related to heat medium 15 and may include, for example, a thermistor. The first temperature sensor 31a is disposed in the pipe 5 on the inlet side of the pump 21a. The first temperature sensor 31b is disposed in the pipe 5 on the inlet of the pump 21b.

Each of the four second temperature sensors 34 (second temperature sensor 34a to second temperature sensor 34d) is disposed between the first heat medium flow switching device 22 and the heat medium flow control device 25 and detects the temperature of the heat medium flowing out of the use side heat exchanger 26. A thermistor or the like may be used as the second temperature sensor 34. The second temperature sensors 34 are arranged so that the number (four in this case) corresponds to the installed number of indoor units 2. Furthermore, illustrated from the bottom of the drawing are the second temperature sensor 34a, the second temperature sensor 34b, the second temperature sensor 34c, and the second temperature sensor 34d so as to correspond to the respective indoor units 2.

Each of the four third temperature sensors 35 (third temperature sensors 35a to 35d) is disposed on the inlet side or the outlet side of a heat source side refrigerant of the heat exchanger related to heat medium 15 and detects the temperature of the heat source side refrigerant flowing into the heat exchanger related to heat medium 15, or the temperature of the heat source side refrigerant flowing out of the heat exchanger related to heat medium 15 and may include, for example, a thermistor. The third temperature sensor 35a is disposed between the heat exchanger related to heat medium 15a and the second refrigerant flow switching devices 18a. The third temperature sensor 35b is disposed between the heat exchanger related to heat medium 15a and the expansion device 16a. The third temperature sensor 35c is disposed between the heat exchanger related to heat medium 15b and the second refrigerant flow switching devices 18b. The third temperature sensor 35d is disposed between the heat exchanger related to heat medium 15b and the expansion device 16b.

The pressure sensor 36 is disposed between the heat exchanger related to heat medium 15b and the expansion device 16b, similar to the installation position of the third temperature sensor 35d, and is configured to detect the pressure of the heat source side refrigerant flowing between the heat exchanger related to heat medium 15b and the expansion device 16b.

Further, the controller (not illustrated) includes, for example, a microcomputer and controls, for example, the driving frequency of the compressor 10, the rotation speed (including ON/OFF) of the air-sending device, switching of the first refrigerant flow switching device 11, driving of the pumps 21, the opening degree of each expansion device 16, on and off of each on-off device 17, switching of the second refrigerant flow switching devices 18, switching of the first heat medium flow switching devices 22, switching of the second heat medium flow direction switching devices 23, and the driving of each heat medium flow control device 25 on the basis of the information detected by the various detecting devices and an instruction from a remote control to carry out the operation modes which will be described later.

Furthermore, the controller includes a first control unit disposed in or near the heat medium relay unit 3 and a second control unit disposed in or near the outdoor unit 1. The first control unit controls each heat medium flow control device, each pump, and each expansion device 16, which is included in the heat medium relay unit 3, and the second control unit controls the compressor 10 included in the outdoor unit. At this time, for example, the first control unit and the second control unit are connected to each other such that wireless or wire communication can be performed, and a control target value of either or both of the condensing temperature and the evaporating temperature of the heat source side refrigerant, or either or both of amount of change of the condensing temperature and amount of change of the evaporating temperature is transmitted from the first control unit to the second control unit as a control signal. Note that the control operation will be described later.

In addition, the heat medium flow control devices 25 may be housed in a separate housing from that of the heat medium relay unit 3. In this case, a third control unit is disposed at a position in or near the housing in which the heat medium flow control devices 25 are housed, and the third control unit is connected to the first control unit such that wireless or wire communication can be performed. Moreover, the opening degree, the opening area, or information on a value corresponding to the opening area of the heat medium flow control devices 25 is transmitted from the third control unit to the first control unit. It should be noted that in Embodiment, a case is described in which the controller is disposed in each unit, but not limited to this case, centralized control can be performed by use of a single control device.

The pipes 5 in which the heat medium flows include the pipes connected to the heat exchanger related to heat medium 15a and the pipes connected to the heat exchanger related to heat medium 15b. Each pipe 5 is branched (into four in this case) in accordance with the number of indoor units 2 connected to the heat medium relay unit 3. The pipes 5 are connected by the first heat medium flow switching devices 22 and the second heat medium flow switching devices 23. Controlling the first heat medium flow switching devices 22 and the second heat medium flow switching devices 23 determines whether the heat medium flowing from the heat exchanger related to heat medium 15a is allowed to flow into the use side heat exchanger 26 and whether the heat medium flowing from the heat exchanger related to heat medium 15b is allowed to flow into the use side heat exchanger 26.

In the air-conditioning apparatus 100, the compressor 10, the first refrigerant flow switching device 11, the heat source side heat exchanger 12, the on-off devices 17, the second refrigerant flow switching devices 18, a refrigerant passage of the heat exchanger related to heat medium 15a, the expansion devices 16, and the accumulator 19 are connected through the refrigerant pipes 4, thus forming the refrigerant cycle A. In addition, a heat medium passage of the heat exchanger related to heat medium 15a, the pumps 21, the first heat medium flow switching devices 22, the heat medium flow control devices 25, the use side heat exchangers 26, and the second heat medium flow switching devices 23 are connected through the pipes 5, thus forming heat medium cycle B. In other words, the plurality of use side heat exchangers 26 are connected in parallel to each of the heat exchangers related to heat medium 15, thus turning the heat medium cycle B into a multi-system.

Accordingly, in the air-conditioning apparatus 100, the outdoor unit 1 and the heat medium relay unit 3 are connected through the heat exchanger related to heat medium 15a and the heat exchanger related to heat medium 15b arranged in the heat medium relay unit 3. The heat medium relay unit 3 and each indoor unit 2 are connected through the heat exchanger related to heat medium 15a and the heat exchanger related to heat medium 15b. In other words, in the air-conditioning apparatus 100, the heat exchanger related to heat medium 15a and the heat exchanger related to heat medium 15b each exchange heat between the heat source side refrigerant circulating in the refrigerant cycle A and the heat medium circulating in the heat medium cycle B.

As the heat medium, a single phase liquid that does not change into two phases, gas and liquid, while circulating in the heat medium circulation circuit B is used. For example, water or antifreeze solution is used.

Figure 3A:
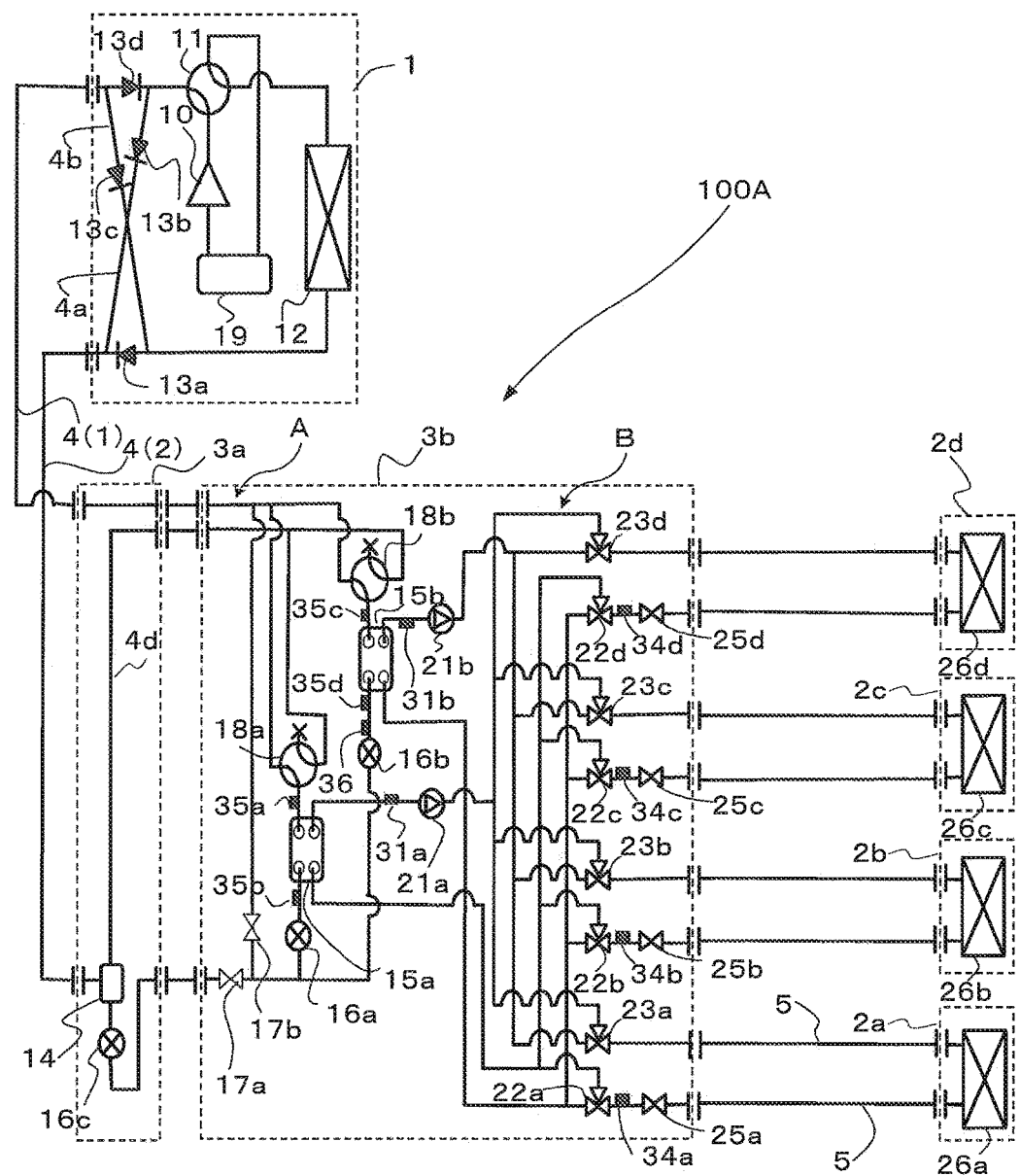
FIG. 3A is a schematic circuit diagram illustrating an exemplary circuit configuration of the air-conditioning apparatus according to Embodiment of the invention.

FIG. 3A is another schematic circuit diagram illustrating an exemplary circuit configuration of the air-conditioning apparatus (hereinafter, referred to as an "air-conditioning apparatus 100A") according to Embodiment of the invention. The configuration of the air-conditioning apparatus 100A in a case in which a heat medium relay unit 3 is separated into a main heat medium relay unit 3a and a sub heat medium relay unit 3b will be described with reference to FIG. 3A. As illustrate in FIG. 3A, a housing of the heat medium relay unit 3 is separated such that the heat medium relay unit 3 is composed of the main heat medium relay unit 3a and the sub heat medium relay unit 3b. This separation allows a plurality of sub heat medium relay units 3b to be connected to the single main heat medium relay unit 3a as illustrated in FIG. 2.

The main heat medium relay unit 3a includes a gas-liquid separator 14 and an expansion device 16c. Other components are arranged in the sub heat medium relay unit 3b. The gas-liquid separator 14 is connected to a single refrigerant pipe 4 connected to an outdoor unit 1 and is connected to two refrigerant pipes 4 connected to a heat exchanger related to heat medium 15a and a heat exchanger related to heat medium 15b in the sub heat medium relay unit 3b, and is configured to separate heat source side refrigerant supplied from the outdoor unit 1 into vapor refrigerant and liquid refrigerant. The expansion device 16c, disposed downstream regarding the flow direction of the liquid refrigerant flowing out of the gas-liquid separator 14, has functions of a reducing valve and an expansion valve and reduces the pressure of and expands the heat source side refrigerant. During a cooling and heating mixed operation, the expansion device 16c is controlled such that the pressure in an outlet of the expansion device 16c is at a medium state. The expansion device 16c may include a component having a variably controllable opening degree, such as an electronic expansion valve. This arrangement allows a plurality of sub heat medium relay units 3b to be connected to the main heat medium relay unit 3a.

Various operation modes executed by the air-conditioning apparatus 100 will be described below. The air-conditioning apparatus 100 allows each indoor unit 2, based on an instruction from the indoor unit 2, to perform a cooling operation or heating operation. Specifically, the air-conditioning apparatus 100 allows all of the indoor units 2 to perform the same operation and also allows each of the indoor units 2 to perform different operations. It should be noted that since the same applies to operation modes carried out by the air-conditioning apparatus 100A, description of the operation modes carried out by the air-conditioning apparatus 100A is omitted. In the following description, the air-conditioning apparatus includes the air-conditioning apparatus 100A.

The operation modes carried out by the air-conditioning apparatus 100 includes a cooling only operation mode in which all of the operating indoor units 2 perform the cooling operation, a heating only operation mode in which all of the operating indoor units 2 perform the heating operation, a cooling main operation mode which is a cooling and heating mixed operation mode in which cooling load is larger, and a heating main operation mode which is a cooling and heating mixed operation mode in which heating load is larger. The operation modes will be described below with respect to the flow of the heat source side refrigerant and that of the heat medium.

[Cooling Only Operation Mode]

Figure 4:
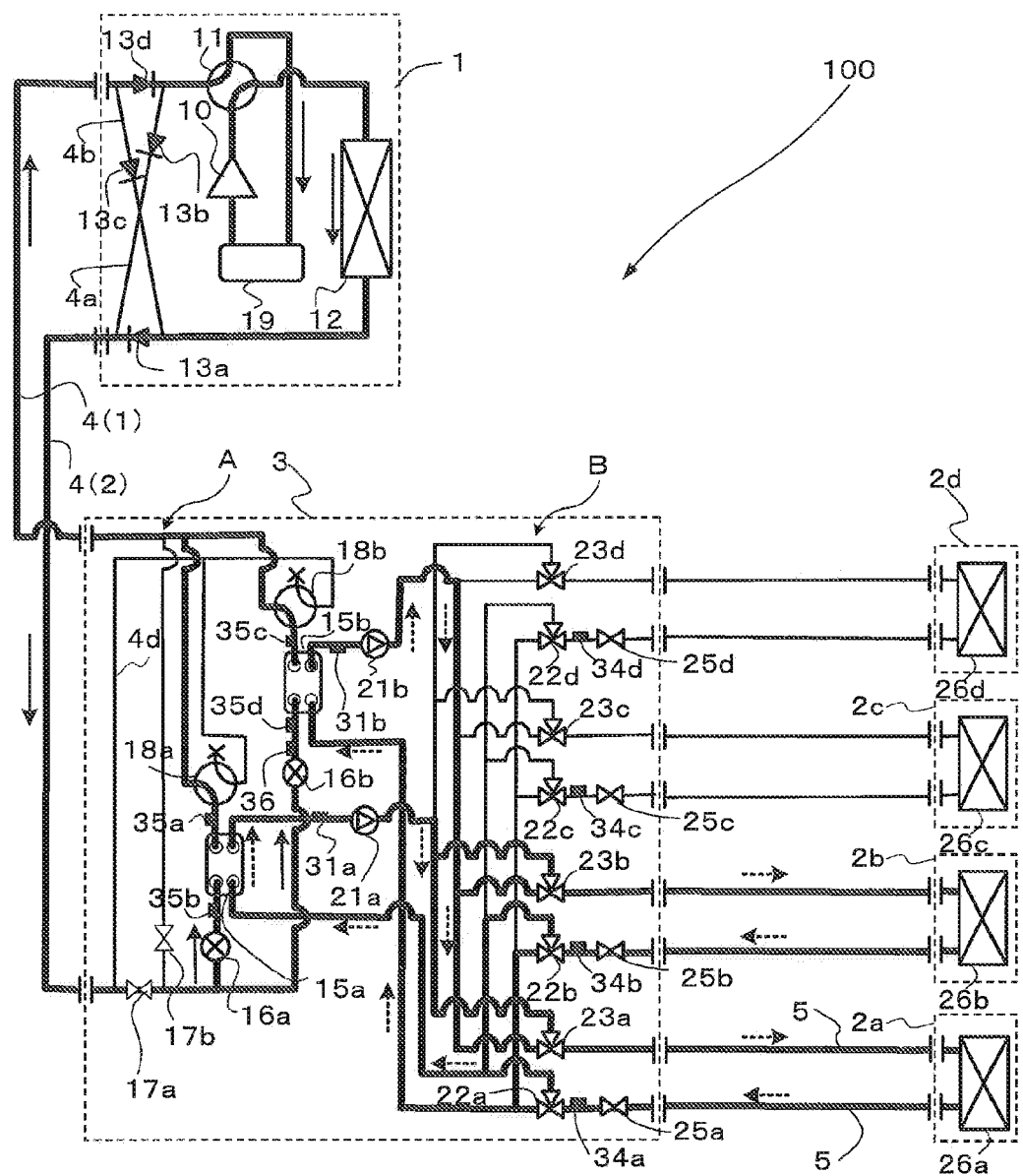
FIG. 4 is a refrigerant circuit diagram illustrating flows of refrigerants in a cooling only operation mode of the air-conditioning apparatus according to Embodiment of the invention.

FIG. 4 is a refrigerant circuit diagram illustrating the flows of refrigerants in the cooling only operation mode of the air-conditioning apparatus 100. The cooling only operation mode will be described with respect to a case in which a cooling load is generated only in a use side heat exchanger 26a and a use side heat exchanger 26b in FIG. 4. Furthermore, in FIG. 4, pipes indicated by thick lines correspond to pipes through which the refrigerants (the heat source side refrigerant and the heat medium) flow. In addition, the direction of flow of the heat source side refrigerant is indicated by solid-line arrows and the direction of flow of the heat medium is indicated by broken-line arrows in FIG. 4.

In the cooling only operation mode illustrated in FIG. 4, in the outdoor unit 1, a first refrigerant flow switching device 11 is switched such that the heat source side refrigerant discharged from a compressor 10 flows into a heat source side heat exchanger 12. In the heat medium relay unit 3, the pump 21a and the pump 21b are driven, the heat medium flow control device 25a and the heat medium flow control device 25b are opened, and the heat medium flow control device 25c and the heat medium flow control device 25d are fully closed such that the heat medium circulates between each of the heat exchanger related to heat medium 15a and the heat exchanger related to heat medium 15b and each of the use side heat exchanger 26a and the use side heat exchanger 26b.

First, the flow of the heat source side refrigerant in the refrigerant cycle A will be described. A low-temperature low-pressure refrigerant is compressed by the compressor 10 and is discharged as a high-temperature high-pressure gas refrigerant therefrom. The high-temperature high-pressure gas refrigerant discharged from the compressor 10 flows through the first refrigerant flow switching device 11 into the heat source side heat exchanger 12. Then, the refrigerant is condensed into a high-pressure liquid refrigerant while transferring heat to outdoor air in the heat source side heat exchanger 12. The high-pressure liquid refrigerant flowing out of the heat source side heat exchanger 12 passes through a check valve 13a, flows out of the outdoor unit 1, passes through the refrigerant pipe 4, and flows into the heat medium relay unit 3. The high-pressure liquid refrigerant flowing into the heat medium relay unit 3 is branched after passing through an on-off device 17a and is expanded into a low-temperature low-pressure two-phase refrigerant by an expansion device 16a and an expansion device 16b.

This two-phase refrigerant flows into each of the heat exchanger related to heat medium 15a and the heat exchanger related to heat medium 15b, functioning as evaporators, removes heat from the heat medium circulating in a heat medium cycle B to cool the heat medium, and thus turns into a low-temperature low-pressure gas refrigerant. The gas refrigerant, which has flowed out of each of the heat exchanger related to heat medium 15a and the heat exchanger related to heat medium 15b, flows out of the heat medium relay unit 3 through the corresponding one of a second refrigerant flow switching device 18a and a second refrigerant flow switching device 18b, passes through the refrigerant pipe 4, and again flows into the outdoor unit 1. The refrigerant flowing into the outdoor unit 1 passes through the check valve 13d, the first refrigerant flow switching device 11, and the accumulator 19, and is then again sucked into the compressor 10.

At this time, the opening degree of the expansion device 16a is controlled such that superheat (the degree of superheat) is constant, the superheat being obtained as the difference between a temperature detected by the third temperature sensor 35a and that detected by the third temperature sensor 35b. Similarly, the opening degree of the expansion device 16b is controlled such that superheat is constant, the superheat being obtained as the difference between a temperature detected by a third temperature sensor 35c and that detected by a third temperature sensor 35d. In addition, the on-off device 17a is opened and the on-off device 17b is closed.

Next, the flow of the heat medium in the heat medium cycle B will be described. In the cooling only operation mode, both the heat exchanger related to heat medium 15a and the heat exchanger related to heat medium 15b transfer cooling energy of the heat source side refrigerant to the heat medium, and the pump 21a and the pump 21b allow the cooled heat medium to flow through the pipes 5. The heat medium, which has flowed out of each of the pump 21a and the pump 21b while being pressurized, flows through the second heat medium flow switching device 23a and the second heat medium flow switching device 23b into the use side heat exchanger 26a and the use side heat exchanger 26b. The heat medium removes heat from the indoor air in each of the use side heat exchanger 26a and the use side heat exchanger 26b, thus cooling the indoor space 7.

The heat medium then flows out of each of the use side heat exchanger 26a and the use side heat exchanger 26b and flows into the heat medium flow control device 25a and the heat medium flow control device 25b. At this time, the function of each of the heat medium flow control device 25a and the heat medium flow control device 25b allows the heat medium to flow into the corresponding one of the use side heat exchanger 26a and the use side heat exchanger 26b while controlling the heat medium to a flow rate sufficient to cover an air conditioning load required in the indoor space. The heat medium, which has flowed out of the heat medium flow control device 25a and the heat medium flow control device 25b, passes through the first heat medium flow switching device 22a and the first heat medium flow switching device 22b, flows into the heat exchanger related to heat medium 15a and the heat exchanger related to heat medium 15b, and is again sucked into the pump 21a and the pump 21b.

Note that in the pipes 5 of each use side heat exchanger 26, the heat medium is directed to flow from the second heat medium flow switching device 23 through the heat medium flow control device 25 to the first heat medium flow switching device 22. The air conditioning load required in the indoor space 7 can be satisfied by controlling the difference between a temperature detected by the first temperature sensor 31a or a temperature detected by the first temperature sensor 31b and a temperature detected by the second temperature sensor 34 so that difference is maintained at a target value. As regards a temperature at the outlet of each heat exchanger related to heat medium 15, either of the temperature detected by the first temperature sensor 31a and that detected by the first temperature sensor 31b may be used. Alternatively, the mean temperature of the two may be used. At this time, the opening degree of each of the first heat medium flow switching devices 22 and the second heat medium flow switching devices 23 is set to a medium degree such that passages to both of the heat exchanger related to heat medium 15a and the heat exchanger related to heat medium 15b are established.

Upon carrying out the cooling only operation mode, since it is unnecessary to supply the heat medium to each use side heat exchanger 26 having no heat load (including thermo-off), the passage is closed by the corresponding heat medium flow control device 25 such that the heat medium does not flow into the corresponding use side heat exchanger 26. In FIG. 4, the heat medium is supplied to the use side heat exchanger 26a and the use side heat exchanger 26b because these use side heat exchangers have heat loads. The use side heat exchanger 26c and the use side heat exchanger 26d have no heat load and the corresponding heat medium flow control devices 25c and 25d are fully closed. When a heat load is generated in the use side heat exchanger 26c or the use side heat exchanger 26d, the heat medium flow control device 25c or the heat medium flow control device 25d may be opened such that the heat medium is circulated.

[Heating Only Operation Mode]

Figure 5:
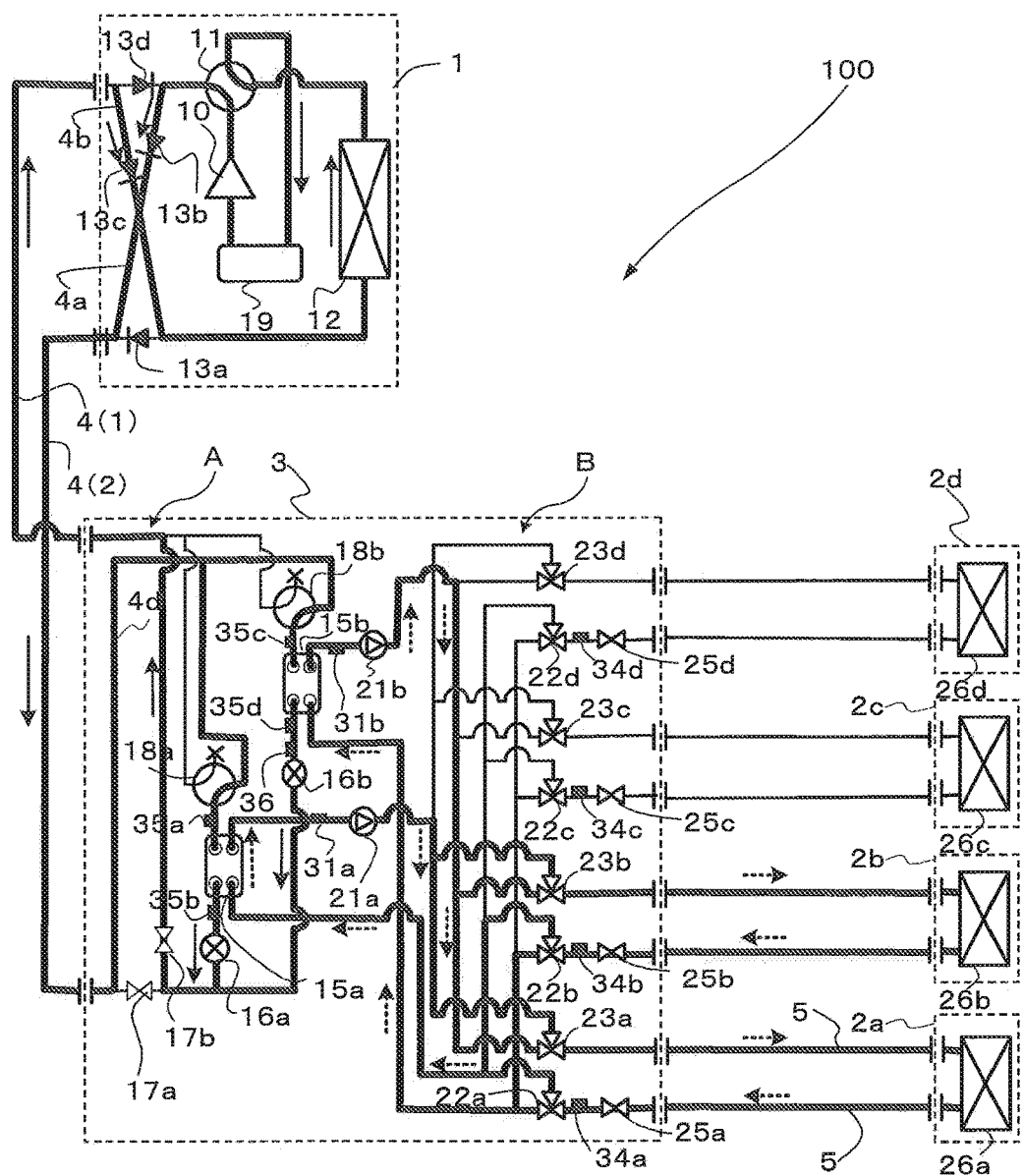
FIG. 5 is a refrigerant circuit diagram illustrating flows of refrigerants in a heating only operation mode of the air-conditioning apparatus according to Embodiment of the invention.

FIG. 5 is a refrigerant circuit diagram illustrating the flows of refrigerants in the cooling only operation mode of the air-conditioning apparatus 100. The heating only operation mode will be described with respect to a case in which a heating load is generated only in the use side heat exchanger 26a and the use side heat exchanger 26b in FIG. 5. Furthermore, in FIG. 5, pipes indicated by thick lines correspond to pipes through which the refrigerants (the heat source side refrigerant and the heat medium) flow. In addition, the direction of flow of the heat source side refrigerant is indicated by solid-line arrows and the direction of flow of the heat medium is indicated by broken-line arrows in FIG. 5.

In the heating only operation mode illustrated in FIG. 5, in the outdoor unit 1, the first refrigerant flow switching device 11 is switched such that the heat source side refrigerant discharged from the compressor 10 flows into the heat medium relay unit 3 without passing through the heat source side heat exchanger 12. In the heat medium relay unit 3, the pump 21a and the pump 21b are driven, the heat medium flow control device 25a and the heat medium flow control device 25b are opened, and the heat medium flow control device 25c and the heat medium flow control device 25d are fully closed such that the heat medium circulates between each of the heat exchanger related to heat medium 15a and the heat exchanger related to heat medium 15b and each of the use side heat exchanger 26a and the use side heat exchanger 26b.

First, the flow of the heat source side refrigerant in the refrigerant cycle A will be described. A low-temperature low-pressure refrigerant is compressed by the compressor 10 and is discharged as a high-temperature high-pressure gas refrigerant therefrom. The high-temperature high-pressure gas refrigerant discharged from the compressor 10 passes through the first refrigerant flow switching device 11, flows through the first connecting pipe 4a, passes through the check valve 13b, and flows out of the outdoor unit 1. The high-temperature high-pressure gas refrigerant, which has flowed out of the outdoor unit 1, passes through the refrigerant pipe 4 and flows into the heat medium relay unit 3. The high-temperature high-pressure gas refrigerant that has flowed into to heat medium relay unit 3 is branched, passes through each of the second refrigerant flow switching device 18a and the second refrigerant flow switching device 18b, and flows into the corresponding one of the heat exchanger related to heat medium 15a and the heat exchanger related to heat medium 15b.

The high-temperature high-pressure gas refrigerant flowing into each of the heat exchanger related to heat medium 15a and the heat exchanger related to heat medium 15b is condensed into a high-pressure liquid refrigerant while transferring heat to the heat medium circulating in the heat medium cycle B. The liquid refrigerant flowing out of the heat exchanger related to heat medium 15a and that flowing out of the heat exchanger related to heat medium 15b are expanded into a low-temperature low-pressure, two-phase refrigerant through the expansion device 16a and the expansion device 16b. This two-phase refrigerant passes through the on-off device 17b, flows out of the heat medium relay unit 3, passes through the refrigerant pipe 4, and again flows into the outdoor unit 1. The refrigerant flowing into the outdoor unit 1 flows through the second connecting pipe 4b, passes through the check valve 13c, and flows into the heat source side heat exchanger 12, functioning as an evaporator.

Then, the refrigerant flowing into the heat source side heat exchanger 12 removes heat from the outdoor air in the heat source side heat exchanger 12 and thus turns into a low-temperature low-pressure gas refrigerant. The low-temperature low-pressure gas refrigerant flowing out of the heat source side heat exchanger 12 passes through the first refrigerant flow switching device 11 and the accumulator 19 and is again sucked into the compressor 10.

At that time, the opening degree of the expansion device 16a is controlled such that subcooling (degree of subcooling) obtained as the difference between a saturation temperature converted from a pressure detected by the pressure sensor 36 and a temperature detected by the third temperature sensor 35b is constant. Similarly, the opening degree of the expansion device 16b is controlled such that subcooling is constant, the subcooling being obtained as the difference between the value indicating the saturation temperature converted from the pressure detected by the pressure sensor 36 and a temperature detected by the third temperature sensor 35d. In addition, the on-off device 17a is closed and the on-off device 17b is opened. Note that when a temperature at the middle position of the heat exchangers related to heat medium 15 can be measured, the temperature at the middle position may be used instead of the pressure sensor 36. Thus, such a system can be constructed inexpensively.

Next, the flow of the heat medium in the heat medium cycle B will be described.

In the heating only operation mode, both of the heat exchanger related to heat medium 15a and the heat exchanger related to heat medium 15b transfer heating energy of the heat source side refrigerant to the heat medium, and the pump 21a and the pump 21b allow the heated heat medium to flow through the pipes 5. The heat medium, which has flowed out of each of the pump 21a and the pump 21b while being pressurized, flows through the second heat medium flow switching device 23a and the second heat medium flow switching device 23b into the use side heat exchanger 26a and the use side heat exchanger 26b. Then the heat medium transfers heat to the indoor air through each of the use side heat exchanger 26a and the use side heat exchanger 26b, thus heating the indoor space 7.

The heat medium then flows out of each of the use side heat exchanger 26a and the use side heat exchanger 26b and flows into the heat medium flow control device 25a and the heat medium flow control device 25b. At this time, the function of each of the heat medium flow control device 25a and the heat medium flow control device 25b allows the heat medium to flow into the corresponding one of the use side heat exchanger 26a and the use side heat exchanger 26b while controlling the heat medium to a flow rate sufficient to cover an air conditioning load required in the indoor space. The heat medium, which has flowed out of the heat medium flow control device 25a and the heat medium flow control device 25b, passes through the first heat medium flow switching device 22a and the first heat medium flow switching device 22b, flows into the heat exchanger related to heat medium 15a and the heat exchanger related to heat medium 15b, and is again sucked into the pump 21a and the pump 21b.

Note that in the pipes 5 of each use side heat exchanger 26, the heat medium is directed to flow from the second heat medium flow switching device 23 through the heat medium flow control device 25 to the first heat medium flow switching device 22. The air conditioning load required in the indoor space 7 can be satisfied by controlling the difference between a temperature detected by the first temperature sensor 31a or a temperature detected by the first temperature sensor 31b and a temperature detected by the second temperature sensor 34 so that difference is maintained at a target value. As regards a temperature at the outlet of each heat exchanger related to heat medium 15, either of the temperature detected by the first temperature sensor 31a and that detected by the first temperature sensor 31b may be used. Alternatively, the mean temperature of the two may be used.

At this time, the opening degree of each of the first heat medium flow switching devices 22 and the second heat medium flow switching devices 23 is set to a medium degree such that passages to both of the heat exchanger related to heat medium 15a and the heat exchanger related to heat medium 15b are established. Although the use side heat exchanger 26a should essentially be controlled on the basis of the difference between a temperature at its inlet and that at its outlet, since the temperature of the heat medium on the inlet side of the use side heat exchanger 26 is substantially the same as that detected by the first temperature sensor 31b, the use of the first temperature sensor 31b can reduce the number of temperature sensors, so that the system can be constructed inexpensively.

Upon carrying out the heating only operation mode, since it is unnecessary to supply the heat medium to each use side heat exchanger 26 having no heat load (including thermo-off), the passage is closed by the corresponding heat medium flow control device 25 such that the heat medium does not flow into the corresponding use side heat exchanger 26. In FIG. 5, the heat medium is supplied to the use side heat exchanger 26a and the use side heat exchanger 26b because these use side heat exchangers have heat loads. The use side heat exchanger 26c and the use side heat exchanger 26d have no heat load and the corresponding heat medium flow control devices 25c and 25d are fully closed. When a heat load is generated in the use side heat exchanger 26c or the use side heat exchanger 26d, the heat medium flow control device 25c or the heat medium flow control device 25d may be opened such that the heat medium is circulated.

[Cooling Main Operation Mode]

Figure 6:
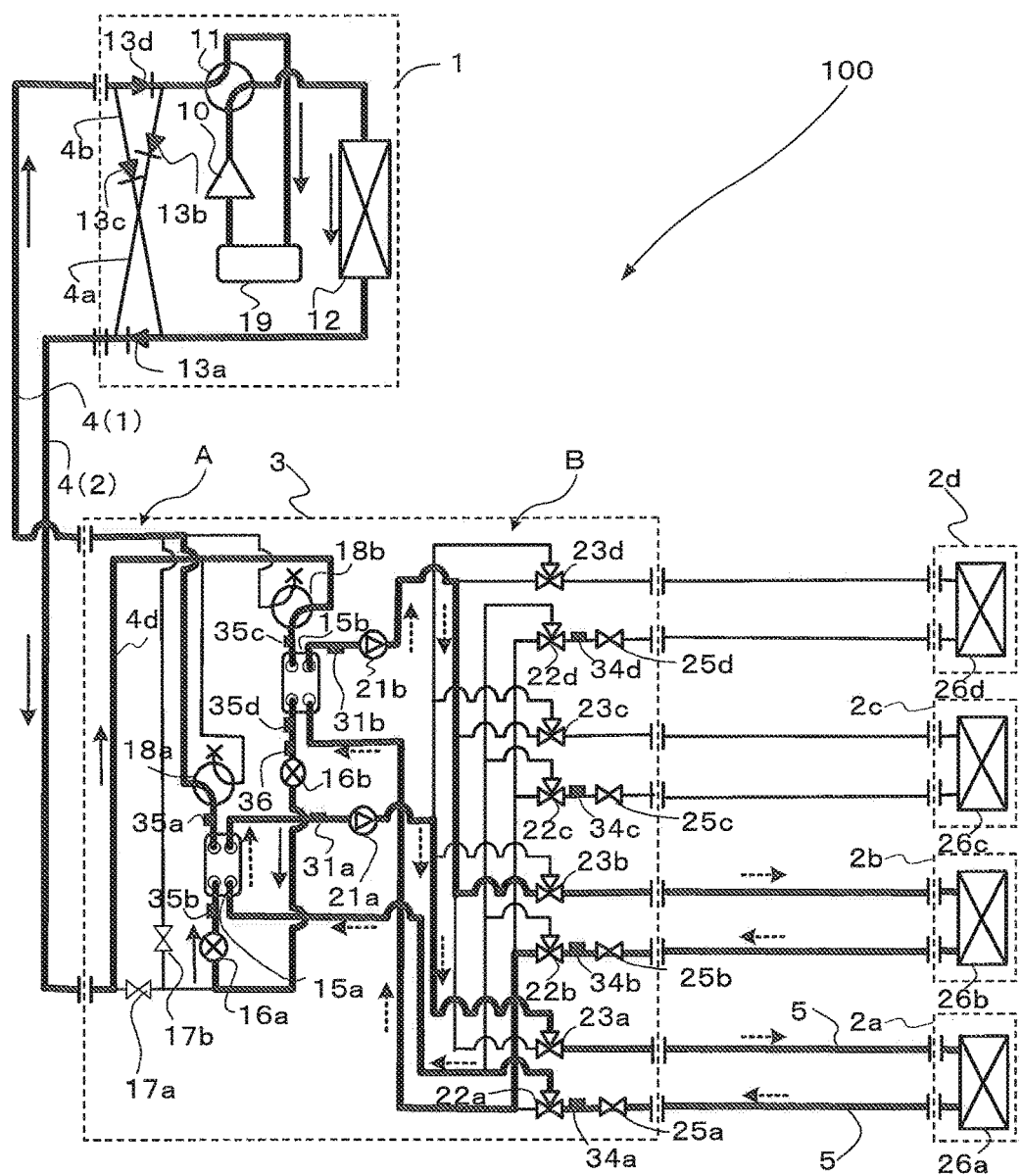
FIG. 6 is a refrigerant circuit diagram illustrating flows of refrigerants in a cooling main operation mode of the air-conditioning apparatus according to Embodiment of the invention.

FIG. 6 is a refrigerant circuit diagram illustrating the flows of the refrigerants in the cooling main operation mode of the air-conditioning apparatus 100. The cooling main operation mode will be described with respect to a case in which a cooling load is generated in the use side heat exchanger 26a and a heating load is generated in the use side heat exchanger 26b in FIG. 6. Furthermore, in FIG. 6, pipes indicated by thick lines correspond to pipes through which the refrigerants (the heat source side refrigerant and the heat medium) circulate. In addition, the direction of flow of the heat source side refrigerant is indicated by solid-line arrows and the direction of flow of the heat medium is indicated by broken-line arrows in FIG. 6.

In the cooling main operation mode illustrated in FIG. 6, in the outdoor unit 1, the first refrigerant flow switching device 11 is switched such that the heat source side refrigerant discharged from the compressor 10 flows into the heat source side heat exchanger 12. In the heat medium relay unit 3, the pump 21a and the pump 21b are driven, the heat medium flow control device 25a and the heat medium flow control device 25b are opened, and the heat medium flow control device 25c and the heat medium flow control device 25d are fully closed such that the heat medium circulates between each of the heat exchanger related to heat medium 15a and the heat exchanger related to heat medium 15b and each of the use side heat exchanger 26a and the use side heat exchanger 26b.

First, the flow of the heat source side refrigerant in the refrigerant cycle A will be described. A low-temperature low-pressure refrigerant is compressed by the compressor 10 and is discharged as a high-temperature high-pressure gas refrigerant therefrom. The high-temperature high-pressure gas refrigerant discharged from the compressor 10 flows through the first refrigerant flow switching device 11 into the heat source side heat exchanger 12. The refrigerant is condensed into a two-phase refrigerant in the heat source side heat exchanger 12 while transferring heat to the outside air. The two-phase refrigerant flowing out of the heat source side heat exchanger 12 passes through the check valve 13a, flows out of the outdoor unit 1, passes through the refrigerant pipe 4, and flows into the heat medium relay unit 3. The two-phase refrigerant flowing into the heat medium relay unit 3 passes through the second refrigerant flow switching device 18b and flows into the heat exchanger related to heat medium 15b, functioning as a condenser.

The two-phase refrigerant that has flowed into the heat exchanger related to heat medium 15b is condensed and liquefied while transferring heat to the heat medium circulating in the heat medium cycle B, and turns into a liquid refrigerant. The liquid refrigerant flowing out of the heat exchanger related to heat medium 15b is expanded into a low-pressure two-phase refrigerant by the expansion device 16b. This low-pressure two-phase refrigerant flows through the expansion device 16a into the heat exchanger related to heat medium 15a, functioning as an evaporator. The low-pressure two-phase refrigerant flowing into the heat exchanger related to heat medium 15a removes heat from the heat medium circulating in the heat medium cycle B to cool the heat medium, and thus turns into a low-pressure gas refrigerant. The gas refrigerant flows out of the heat exchanger related to heat medium 15a, passes through the second refrigerant flow switching device 18a, flows out of the heat transfer medium relay unit 3, and flows into the outdoor unit 1 again through the refrigerant pipe 4. The refrigerant flowing into the outdoor unit 1 passes through the check valve 13d, the first refrigerant flow switching device 11, and the accumulator 19, and is then again sucked into the compressor 10.

At this time, the opening degree of the expansion device 16b is controlled such that superheat is constant, the superheat being obtained as the difference between a temperature detected by the third temperature sensor 35a and that detected by the third temperature sensor 35b. In addition, the expansion device 16a is fully opened, the on-off device 17a is closed, and the on-off device 17b is closed. In addition, the opening degree of the expansion device 16b may be controlled such that subcooling is constant, the subcooling being obtained as the difference between a value indicating a saturation temperature converted from a pressure detected by the pressure sensor 36 and a temperature detected by the third temperature sensor 35d. Alternatively, the expansion device 16b may be fully opened and the expansion device 16a may control the superheat or the subcooling.

Next, the flow of the heat medium in the heat medium cycle B will be described. In the cooling main operation mode, the heat exchanger related to heat medium 15b transfers heating energy of the heat source side refrigerant to the heat medium, and the pump 21b allows the heated heat medium to flow through the pipes 5. Furthermore, in the cooling main operation mode, the heat exchanger related to heat medium 15a transfers cooling energy of the heat source side refrigerant to the heat medium, and the pump 21a allows the cooled heat medium to flow through the pipes 5. The heat medium, which has flowed out of the pump 21a and the pump 21b while being pressurized, flows through the second heat medium flow switching device 23a and the second heat medium flow switching device 23b into the use side heat exchanger 26a and the use side heat exchanger 26b.

In the use side heat exchanger 26b, the heat medium transfers heat to the indoor air, thus heating the indoor space 7. In addition, in the use side heat exchanger 26a, the heat medium removes heat from the indoor air, thus cooling the indoor space 7. At this time, the function of each of the heat medium flow control device 25a and the heat medium flow control device 25b allows the heat medium to flow into the corresponding one of the use side heat exchanger 26a and the use side heat exchanger 26b while controlling the heat medium to a flow rate sufficient to cover an air conditioning load required in the indoor space. The heat medium, which has passed through the use side heat exchanger 26b with a slight decrease of temperature, passes through the heat medium flow control device 25b and the first heat medium flow switching device 22b, flows into the heat exchanger related to heat medium 15b, and is again sucked into the pump 21b. The heat medium, which has passed through the use side heat exchanger 26a with a slight increase of temperature, passes through the heat medium flow control device 25a and the first heat medium flow switching device 22a, flows into the heat exchanger related to heat medium 15a, and is then again sucked into the pump 21a.

During this time, the function of the first heat medium flow switching devices 22 and the second heat medium flow switching devices 23 allow the heated heat medium and the cooled heat medium to be introduced into the respective use side heat exchangers 26 having a heating load and a cooling load, without being mixed. Note that in the pipes 5 of each of the use side heat exchanger 26 for heating and that for cooling, the heat medium is directed to flow from the second heat medium flow switching device 23 through the heat medium flow control device 25 to the first heat medium flow switching device 22. Furthermore, the difference between the temperature detected by the first temperature sensor 31b and that detected by the second temperature sensor 34 is controlled such that the difference is kept at a target value, so that the heating air conditioning load required in the indoor space 7 can be covered. The difference between the temperature detected by the second temperature sensor 34 and that detected by the first temperature sensor 31a is controlled such that the difference is kept at a target value, so that the cooling air conditioning load required in the indoor space 7 can be covered.

Upon carrying out the cooling main operation mode, since it is unnecessary to supply the heat medium to each use side heat exchanger 26 having no heat load (including thermo-off), the passage is closed by the corresponding heat medium flow control device 25 such that the heat medium does not flow into the corresponding use side heat exchanger 26. In FIG. 6, the heat medium is supplied to the use side heat exchanger 26a and the use side heat exchanger 26b because these use side heat exchangers have heat loads. The use side heat exchanger 26c and the use side heat exchanger 26d have no heat load and the corresponding heat medium flow control devices 25c and 25d are fully closed. When a heat load is generated in the use side heat exchanger 26c or the use side heat exchanger 26d, the heat medium flow control device 25c or the heat medium flow control device 25d may be opened such that the heat medium is circulated.

[Heating Main Operation Mode]

Figure 7:
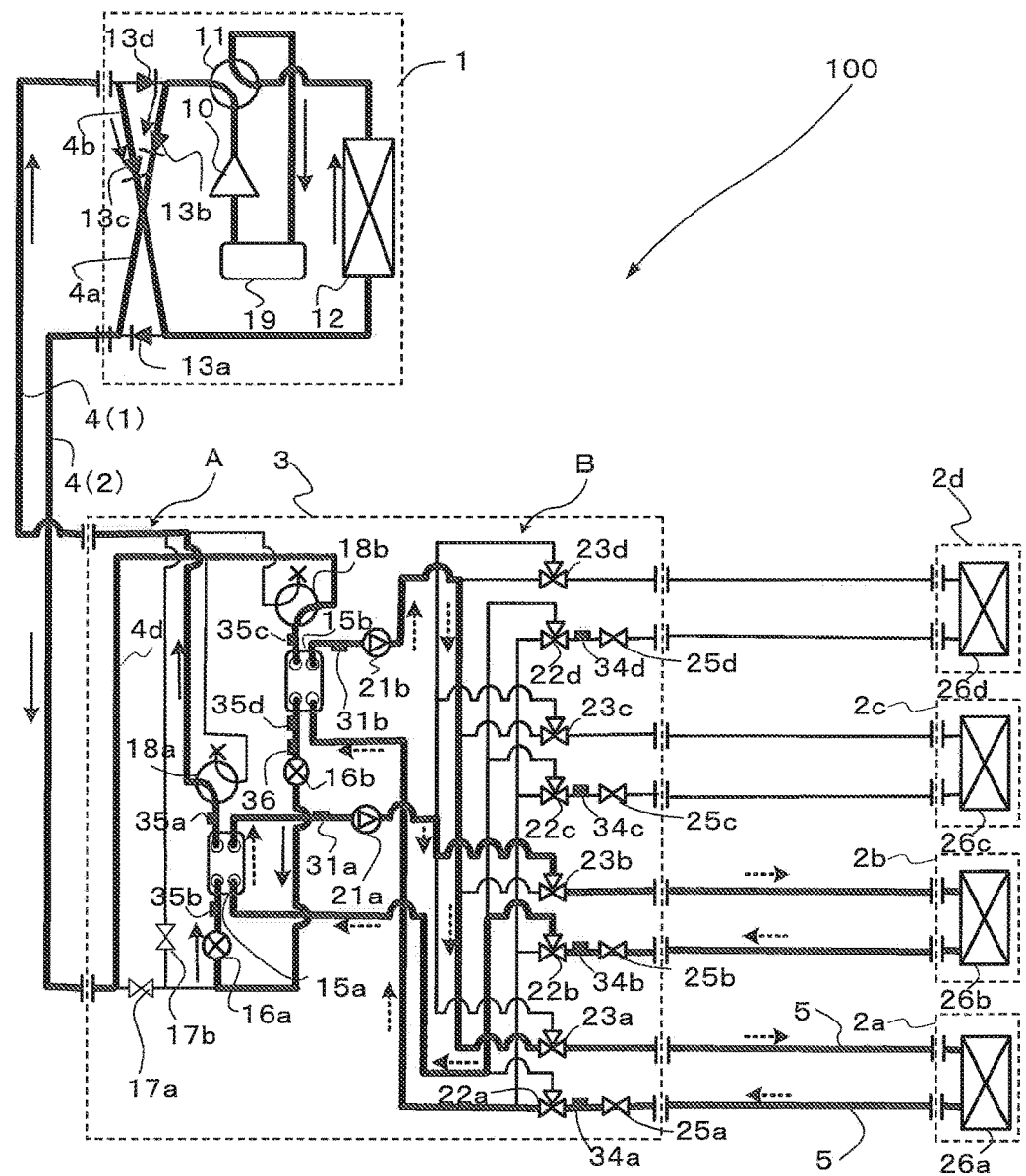
FIG. 7 is a refrigerant circuit diagram illustrating flows of refrigerants in a heating main operation mode of the air-conditioning apparatus according to Embodiment of the invention.

FIG. 7 is a refrigerant circuit diagram illustrating the flows of the refrigerants in the cooling main operation mode of the air-conditioning apparatus 100. The heating main operation mode will be described with respect to a case in which a heating load is generated in the use side heat exchanger 26a and a cooling load is generated in the use side heat exchanger 26b in FIG. 7. Furthermore, in FIG. 7, pipes indicated by thick lines correspond to pipes through which the refrigerants (the heat source side refrigerant and the heat medium) circulate. In addition, the direction of flow of the heat source side refrigerant is indicated by solid-line arrows and the direction of flow of the heat medium is indicated by broken-line arrows in FIG. 7.

In the heating main operation mode illustrated in FIG. 7, in the outdoor unit 1, the first refrigerant flow switching device 11 is switched such that the heat source side refrigerant discharged from the compressor 10 flows into the heat medium relay unit 3 without passing through the heat source side heat exchanger 12. In the heat medium relay unit 3, the pump 21a and the pump 21b are driven, the heat medium flow control device 25a and the heat medium flow control device 25b are opened, and the heat medium flow control device 25c and the heat medium flow control device 25d are closed such that the heat medium circulates between each of the heat exchanger related to heat medium 15a and the heat exchanger related to heat medium 15b and each of the use side heat exchanger 26a and the use side heat exchanger 26b.

First, the flow of the heat source side refrigerant in the refrigerant cycle A will be described. A low-temperature low-pressure refrigerant is compressed by the compressor 10 and is discharged as a high-temperature high-pressure gas refrigerant therefrom. The high-temperature high-pressure gas refrigerant discharged from the compressor 10 passes through the first refrigerant flow switching device 11, flows through the first connecting pipe 4a, passes through the check valve 13b, and flows out of the outdoor unit 1. The high-temperature high-pressure gas refrigerant, which has flowed out of the outdoor unit 1, passes through the refrigerant pipe 4 and flows into the heat medium relay unit 3. The high-temperature high-pressure gas refrigerant flowing into the heat medium relay unit 3 passes through the second refrigerant flow switching device 18b and flows into the heat exchanger related to heat medium 15b, functioning as a condenser.

The gas refrigerant that has flowed into the heat exchanger related to heat medium 15b is condensed and liquefied while transferring heat to the heat medium circulating in the heat medium cycle B, and turns into a liquid refrigerant. The liquid refrigerant flowing out of the heat exchanger related to heat medium 15b is expanded into a low-pressure two-phase refrigerant by the expansion device 16b. This low-pressure two-phase refrigerant flows through the expansion device 16a into the heat exchanger related to heat medium 15a, functioning as an evaporator. The low-pressure two-phase refrigerant flowing into the heat exchanger related to heat medium 15a removes heat from the heat medium circulating in the heat medium cycle B to evaporate, thus cooling the heat medium. This low-pressure two-phase refrigerant flows out of the heat exchanger related to heat medium 15a, passes through the second refrigerant flow switching device 18a, flows out of the heat medium relay unit 3, passes through the refrigerant pipe 4, and again flows into the outdoor unit 1.

The refrigerant flowing into the outdoor unit 1 passes through the check valve 13c and flows into the heat source side heat exchanger 12, functioning as an evaporator. Then, the refrigerant flowing into the heat source side heat exchanger 12 removes heat from the outdoor air in the heat source side heat exchanger 12 and thus turns into a low-temperature low-pressure gas refrigerant. The low-temperature low-pressure gas refrigerant flowing out of the heat source side heat exchanger 12 passes through the first refrigerant flow switching device 11 and the accumulator 19 and is again sucked into the compressor 10.

At this time, the opening degree of the expansion device 16b is controlled such that subcooling is constant, the subcooling being obtained as the difference between a value indicating a saturation temperature converted from a pressure detected by the pressure sensor 36 and a temperature detected by the third temperature sensor 35b. In addition, the expansion device 16a is fully opened, the on-off device 17a is closed, and the on-off device 17b is closed. Alternatively, the expansion device 16b may be fully opened and the expansion device 16a may control the subcooling.

Next, the flow of the heat medium in the heat medium cycle B will be described.

In the heating main operation mode, the heat exchanger related to heat medium 15b transfers heating energy of the heat source side refrigerant to the heat medium, and the pump 21b allows the heated heat medium to flow through the pipes 5. Furthermore, in the heating main operation mode, the heat exchanger related to heat medium 15a transfers cooling energy of the heat source side refrigerant to the heat medium, and the pump 21a allows the cooled heat medium to flow through the pipes 5. The heat medium, which has flowed out of the pump 21a and the pump 21b while being pressurized, flows through the second heat medium flow switching device 23a and the second heat medium flow switching device 23b into the use side heat exchanger 26a and the use side heat exchanger 26b.

In the use side heat exchanger 26b, the heat medium removes heat from the indoor air, thus cooling the indoor space 7. In addition, in the use side heat exchanger 26a, the heat medium transfers heat to the indoor air, thus heating the indoor space 7. At this time, the function of each of the heat medium flow control device 25a and the heat medium flow control device 25b allows the heat medium to flow into the corresponding one of the use side heat exchanger 26a and the use side heat exchanger 26b while controlling the heat medium to a flow rate sufficient to cover an air conditioning load required in the indoor space. The heat medium, which has passed through the use side heat exchanger 26b with a slight increase of temperature, passes through the heat medium flow control device 25b and the first heat medium flow switching device 22b, flows into the heat exchanger related to heat medium 15a, and is then again sucked into the pump 21a. The heat medium, which has passed through the use side heat exchanger 26a with a slight decrease of temperature, passes through the heat medium flow control device 25a and the first heat medium flow switching device 22a, flows into the heat exchanger related to heat medium 15b, and is then again sucked into the pump 21b.

During this time, the function of the first heat medium flow switching devices 22 and the second heat medium flow switching devices 23 allow the heated heat medium and the cooled heat medium to be introduced into the respective use side heat exchangers 26 having a heating load and a cooling load, without being mixed. Note that in the pipes 5 of each of the use side heat exchanger 26 for heating and that for cooling, the heat medium is directed to flow from the second heat medium flow switching device 23 through the heat medium flow control device 25 to the first heat medium flow switching device 22. Furthermore, the difference between the temperature detected by the first temperature sensor 31b and that detected by the second temperature sensor 34 is controlled such that the difference is kept at a target value, so that the heating air conditioning load required in the indoor space 7 can be covered. The difference between the temperature detected by the second temperature sensor 34 and that detected by the first temperature sensor 31a is controlled such that the difference is kept at a target value, so that the cooling air conditioning load required in the indoor space 7 can be covered.

Upon carrying out the heating main operation mode, since it is unnecessary to supply the heat medium to each use side heat exchanger 26 having no heat load (including thermo-off), the passage is closed by the corresponding heat medium flow control device 25 such that the heat medium does not flow into the corresponding use side heat exchanger 26. In FIG. 7, the heat medium is supplied to the use side heat exchanger 26a and the use side heat exchanger 26b because these use side heat exchangers have heat loads. The use side heat exchanger 26c and the use side heat exchanger 26d have no heat load and the corresponding heat medium flow control devices 25c and 25d are fully closed. When a heat load is generated in the use side heat exchanger 26c or the use side heat exchanger 26d, the heat medium flow control device 25c or the heat medium flow control device 25d may be opened such that the heat medium is circulated.

[Refrigerant Pipe 4]

As described above, the air-conditioning apparatus 100 according to Embodiment has several operation modes. In these operation modes, the heat source side refrigerant flows through the refrigerant pipes 4 connecting the outdoor unit 1 and the heat medium relay unit 3.

[Pipe 5]

In some operation modes carried out by the air-conditioning apparatus 100 according to Embodiment, the heat medium, such as water or antifreeze, flows through the pipes 5 connecting the heat medium relay unit 3 and the indoor units 2.

[Heat Medium Flow Control Devices 25a to 25d]

Figure 8:
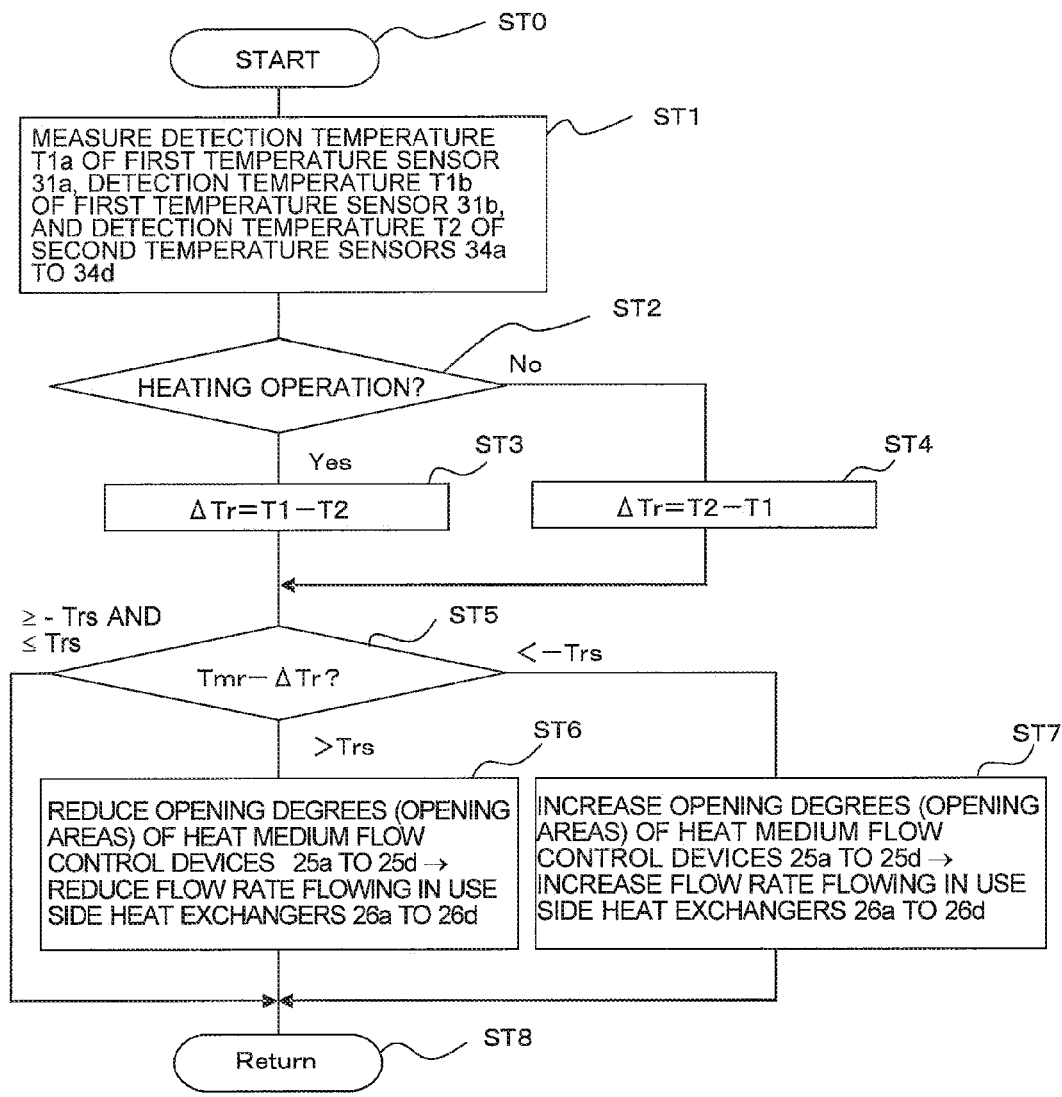
FIG. 8 is a flowchart illustrating a control of a heat medium flow control device of the air-conditioning apparatus according to Embodiment of the invention.

The detailed control of the heat medium flow control devices 25a to 25d will be described with reference to the drawings. FIG. 8 is a flowchart illustrating a control of a heat medium flow control device of the air-conditioning apparatus according to Embodiment of the invention. FIG. 8 is a flowchart corresponding to one indoor unit 2 and the process will be executed in each indoor unit 2. For example, when the operation of the air-conditioning apparatus 100 is started, the controller starts the flow rate control process shown in the flowchart of FIG. 8 (ST 0), and reads a detection temperature T1a of the first temperature sensor 31a, a detection temperature T1b of the first temperature sensor 31b, and the detection temperature T2 of the second temperature sensors 34a to 34d (ST1). Then, the controller determines whether the indoor units 2a to 2d are performing heating (ST2), and when any one of the indoor units 2a to 2d is performing heating, temperature T2 is subtracted from temperature T1b and temperature difference ΔTr between the inlet and outlet of the use side heat exchanger 26a is calculated. On the other hand, when none of the indoor units 2a to 2d is performing heating, temperature T1a is subtracted from temperature T2 and the temperature difference ΔTr between the inlet and outlet of the use side heat exchanger 26a is calculated (ST4).

Next, in each of the use side heat exchangers 26a to 26d, a value, which is a subtraction of the temperature difference ΔTr of the inlet and the outlet of the use side heat exchanger 26 from a control target value Tmr, and a range of stability (upper limit value Trs, lower limit value −Trs) is each compared (ST5). When the subtraction value of ΔTr from Tmr is greater than the upper limit value Trs of the range of stability, instruction is made such that the opening degree (opening area) of the corresponding heat medium flow control device 25 is reduced. Accordingly, the flow rate of the corresponding use side heat exchanger 26 is reduced (ST6). On the other hand, when the subtraction value of ΔTr from Tmr is smaller than the lower limit value Trs of the range of stability, instruction is made such that the opening degree (opening area) of the corresponding heat medium flow control device 25 is increased. Accordingly, the flow rate of the corresponding use side heat exchanger 26 is increased (ST7). Further, when the subtraction value of ΔTr from Tmr is within the range of stability (−Trs≤Tmr−ΔTr≤Trs), no instruction relating to the change in the opening degree of the corresponding heat medium flow control device 25 is made. The sequential process is finished, and the above control is repeatedly performed at the next control timing (ST8).

For example, during cooling operation, when the control target value is 5 degrees C., the range of stability is 1 degrees C., and the temperature difference ΔTr of the inlet and outlet of the use side heat exchanger 26a is 3 degrees C., then control is executed such that the opening degrees (opening areas) of the heat medium flow control devices 25a to 25d are reduced, and the flow rate of the use side heat exchangers 25a to 26d are reduced. Further, when the temperature difference ΔTr of the inlet and outlet of the use side heat exchanger 26a is 7 degrees C., then control is executed such that the opening degrees (opening areas) of the heat medium flow control devices 25a to 25d are increased, and the flow rate of the use side heat exchangers 25a to 26d are increased. The temperature difference ΔTr of the inlet and outlet of the use side heat exchanger 26a is thus made to approach the control target value.

Here, the opening degree of the heat medium flow control device 25a may be made to follow the temperature difference ΔTr of the inlet and outlet of the use side heat exchanger 26a minutely by setting the range of stability to 0 degree C. However, by providing the range of stability Trs, the number of times in which the opening degree of each of the heat medium flow control devices 25a to 25d is changed can be reduced, and the load related to the opening degree can be thus reduced. Accordingly, lifetime of each heat medium flow control devices 25a to 25d can be extended.

Figure 9:
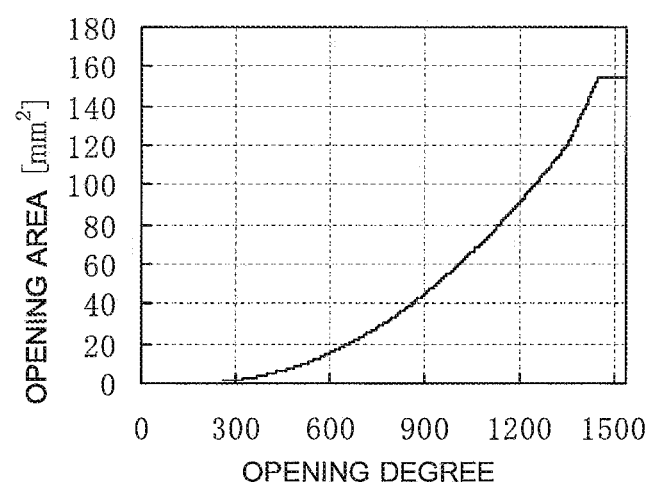
FIG. 9 is a diagram illustrating a relationship between an opening degree and an opening area of a heat medium flow control device of the air-conditioning apparatus according to Embodiment of the invention.

The control method of the heat medium flow control devices 25a to 25d (heat-medium-flow-control-device control) in relation to ST6 and ST7 in the flowchart of FIG. 8 will be described in more detail. When for example, the use side heat exchangers 26a to 26d are in the heating only operation and are under a certain load and when the opening degree of the heat medium flow control devices 25a to 25d is stable at a certain opening degree, denoted as ΔT1 is a subtracted temperature of temperature T2 detected in the second temperature sensor 34a to 34d from temperature T1 detected in the first temperature sensors 31a and 31b. If the target vale of the temperature difference in T1 and T2 is ΔTm, the amount of heat exchange Q in the use side heat exchangers 26a to 26d may be obtained, as an approximate value, by formula (1). Note that ΔP is the pressure difference between before and after the heat medium flow control devices 25a to 25d, ρ and Cp are respectively the density and specific heat of the heat medium, k is a coefficient of other values collected; it is assumed that these do not change even when the temperature difference changes from ΔT1 to ΔTm. A1 and Am respectively denote the opening area of the heat medium flow control devices 25a to 25d when the temperature difference between T1 and T2 is ΔT1 (current) and when the temperature difference between T1 and T2 is ΔTm (target). When stepping-motor-driven valves, for example, are used as the heat medium flow control devices 25a to 25d, the opening area of each opening degree of each heat medium flow control devices 25a to 25d can be obtained due to its geometric structure. For example, FIG. 9 is a diagram illustrating a relationship between the opening degree and the opening area of heat medium flow control devices 25a to 25d.

[Math. 1]

$$Q = (k \cdot A_1 \cdot \sqrt{\Delta P}) \cdot \rho \cdot Cp \cdot \Delta T_1 = (k \cdot A_m \cdot \sqrt{\Delta P}) \cdot \rho \cdot Cp \cdot \Delta T_m \tag{1}$$

By developing the function, formula (2) can be obtained. That is, by using the current temperature difference ΔT1 between T1 and T2 (detected temperature difference), the target value of the temperature difference ΔTm between T1 and T2 (target temperature difference), and an opening area A1 corresponding to the current opening degree of the heat medium flow control devices 25a to 25d, an opening area (opening area predicted value Am) corresponding to the opening degree of the heat medium flow control devices 25a to 25d when ΔTm can be obtained.

[Math. 2]

$$A_m = A_1 \cdot \frac{\Delta T_1}{\Delta T_m} \tag{2}$$

Then, using this opening area predicted value Am and the coefficient ks, the control gain Gs of the heat medium flow control devices 25a to 25d are defined as formula (3), and based on the control gain Gs and the difference between ΔTm and ΔT1 as in formula (4), the opening degree of the heat medium flow control devices 25a to 25d to be outputted in the next control timing can be obtained.

$$Gs = ks \cdot (\text{opening area predicted value } Am - \text{current opening area } A1) \tag{3}$$

$$\text{The opening degree of the next control timing} = \text{current opening degree} + Gs \cdot (\Delta Tm - \Delta T1) \tag{4}$$

In ST6 and ST7 of FIG. 8, the calculation above is executed, the opening degree of the heat medium flow control device 25a to 25d to be outputted in the next control timing is determined, and control is performed.

With this control, the control gain can be increased when the current opening area of the heat medium flow control devices 25a to 25d have a large difference with the target value, and thus convergence can be accelerated.

Note that a case in which the control gain is continuously changed has been described, but the control gain may be changed in steps. For example, it may be changed in steps by referring to a table or the like in which a range of difference value between the opening area predicted value Am and the current opening area A1 corresponds with the control gain.

Furthermore, this control is performed per each use side heat exchanger 26, is independent of the operation mode of the overall system and the number of operating indoor units 2, and can be controlled with the same method.

Note that in the above description, a case in which the opening area is used to control the heat medium flow control devices 25a to 25d is described, but not limited to this case, a value corresponding to the opening area may be used to control the heat medium flow control devices 25a to 25d. As the value corresponding to the opening area of the heat medium flow control devices 25a to 25d, Cv value, for example, may be used. Here, Cv value is a numerical value expressed by us·gal/min (gpm), expressing the flow rate when fresh water of 60 degrees F. (15 degrees C.) is made to flow while the pressure difference between before and after a valve is kept at 1 psi (6.9 kpa). This Cv value is generally used to select valves. Once the fluid type and its condition is determined, this Cv value corresponds one to one with the opening area, and thus, the Cv value can be used for the heat medium flow control devices 25a to 25d, instead of the opening area.

[Pumps 21a and 21b]

The pump control controlling the operating capacities of the pumps 21a and 21b, which are heat medium sending devices, aiming for the opening degree of the heat medium flow control device 25, which is controlled by the heat-medium-flow-control-device control described above, to approach the target opening degree will be subsequently described.

FIG. 10 is a flowchart illustrating a control of a heat medium flow control device of the air-conditioning apparatus according to Embodiment of the invention. It should be noted that the pump 21 corresponding to the heat exchanger related to heat medium 15 that heats the heat medium will be denoted as "heating side pump 21" and the pump 21 corresponding to the heat exchanger related to heat medium 15 that cools the heat medium will be denoted as "cooling side pump 21". Further, note that when two or more pumps 21 are provided, the pumps will be separated into the heating side pump 21 and the cooling side pump 21, and will operate in the same manner.

During the operation of the air-conditioning apparatus 100, the controller starts the pump controlling process at a predetermined control timing (GT0) and determines whether there is any indoor unit 2 that is undergoing heating operation (GT1). When there is any indoor unit 2 that is undergoing heating operation, the total capacity code of the indoor units 2 undergoing heating is denoted as $\Sigma Qjh$ and the area of the heat medium flow control device that has the largest opening area in the heat medium flow control devices 25a to 25d undergoing heating operation is denoted as Ahmax (GT2). Herein, the capacity code, which is information relating to the amount of heat exchange of the use side heat exchangers 26 of the indoor units 2, is set in the control device in advance. Next, an operating capacity (frequency and the like) of the pump 21 during heating operation will be calculated with formulas (5) and (6) (GT3).

$$\text{Hot water side pump capacity} = kh1 \cdot kh2 \cdot \Sigma Qjh \quad (5)$$

$$kh1 = kh1 + kah \cdot (Ah\max/Ab - 1) \quad (6)$$

Here, kh2 is a coefficient converting the capacity code of the indoor unit 2 to the heating side pump capacity, kh1 is the control gain, and kah is a relaxation coefficient and is 0.3, for example. It should be noted that during the heating only operation, the pumps on the hot water side is twice in number compared to the number during cooling and heating mixed operation (cooling main operation mode or heating main operation mode), and thus, the value of kh2 is multiplied by 0.5.

Furthermore, Ab is an opening area corresponding to the target opening area of the heat medium flow control devices 25a to 25d (target value of the opening area). The flow of the heat medium is accompanied with some loss while throttled by the heat medium flow control devices 25a to 25d, and is stabilized at a certain flow rate with the pressure-flow characteristics of the pumps 21a and 21b. In order to reduce power consumption of the pumps 21a and 21b and save energy, the opening degrees of the heat medium flow control devices 25a to 25d need to be large to the extent possible to limit, as least as possible, the incurred loss, and operating capacities of the pumps 21a and 21b need to be reduced in proportion to the enlargement. In order to achieve the above, it is desirable that the opening degrees of the heat medium flow control devices 25a to 25d are at their maximum. However, control to increase the operating capacities of the pumps are also required, and, thus, the target opening area (target value) of the heat medium flow control devices 25a to 25d used in formula (6) uses, for example, an opening area corresponding to 85 percent of the full opening degree. As above, the target opening area is set in advance based on an opening area corresponding to the maximum opening degree of the heat medium flow control device 25.

Using the formula (5) and (6), when the maximum opening degree of the heat medium flow control devices 25a to 25d on the heating side is smaller than the target opening degree, then the operating capacities of the heating side pumps 21a and 21b become smaller, and when the maximum opening degree of the heat medium flow control devices 25a to 25d on the heating side is larger than the target opening degree, then the operating capacities of the heating side pumps 21a and 21b become larger. This changes the flow rate of the heat medium circulating in the heat exchanger related to heat medium 15, and the temperature difference $\Delta Tr$ between the inlet and outlet also changes. Accordingly, in the heat-medium-flow-control-device control, the target opening degree is approached by controlling the opening degree of the heat medium flow control device 25.

Next, the control device determines whether there is any indoor unit undergoing cooling operation (GT4) When there is any indoor unit 2 that is undergoing cooling operation, the total capacity code of the indoor units 2 undergoing cooling is denoted as $\Sigma Qjc$ and the area of the heat medium flow control device that has the largest opening area in the heat medium flow control devices 25a to 25d undergoing cooling operation is denoted as Acmax (GT5). Next, an operating capacity (frequency and the like) of the pump 21 during heating operation will be calculated with formulas (7) and (8) (GT6).

$$\text{Cold water side pump capacity} = kc1 - kc2 \cdot \Sigma Qjc \quad (7)$$

$$kc1 = kc1 + kac(A\text{cmax}/Ab - 1) \quad (8)$$

Here, kc2 is a coefficient converting the capacity code of the indoor unit 2 to the cooling side pump capacity, kc1 is the control gain, and kac is a relaxation coefficient and is 0.3, for example. It should be noted that during the cooling only operation, the pumps on the cold water side is twice in number compared to the number during cooling and heating mixed operation (cooling main operation mode or heating main operation mode), and thus, the value of kc2 is multiplied by 0.5. Ab is the same value as that of the heating indoor units.

Using the formula (7) and (8), when the maximum opening degree of the heat medium flow control devices 25a to 25d on the cooling side is smaller than the target opening degree, then operating capacities of the cooling side pumps 21a and 21b become smaller, and when the maximum opening degree of the heat medium flow control devices 25a to 25d on the cooling side is larger than the target opening degree, then the operating capacities of the cooling side pumps 21a and 21b become larger. This changes the flow rate of the heat medium circulating in the heat exchanger related to heat medium 15, and the temperature difference $\Delta Tr$ between the inlet and outlet also changes. Accordingly, in the heat-medium-flow-control-device control, the target opening degree is approached by controlling the opening degree of the heat medium flow control device 25.

The above process is performed at regular time intervals (GT7) repeatedly, for example. Since in the control of the pumps 21a and 21b, as described above, information on the opening degree of the heat medium flow control devices 25a to 25d is used, the pump control needs to be performed after the control of the heat medium flow control devices 25a to 25d are stable to a certain extent. Accordingly, the control interval (time) of the pumps 21a and 21b needs to be longer than the control interval (time) of the medium flow controllers 25a to 25d. For example, if the control interval of the heat medium flow control devices 25a to 25d is 10 seconds, then the control interval of the pumps 21a and 21b may be, preferably, 3 times or more, such as a value of 30 seconds or 1 minute. However, it is not limited to the above and may be 2 times.

It should be noted that in the above description, although the operating capacities of the pumps 21 are controlled such that the maximum value of the opening area of the heat medium flow control devices 25 (Ahmax, Acmax) approach the target opening area (Ab), it is not limited to the above. During heating operation or cooling operation, for example, the mean value of the opening area of the heat medium flow control device 25 may be obtained, and control may be performed such that the mean value of the opening area approaches the target opening area.

[Condensing Temperature and Evaporating Temperature of Refrigeration Cycle]

Control of the heat medium flow control devices 25a to 25d and pumps 21a and 21b has been described hereinabove. Furthermore, a control of the refrigeration cycle of a refrigerant circuit in which the temperature of the heat medium delivered to the use side heat exchangers 26a to 26b is controlled so as to approach a target temperature will be described.

FIG. 11 is a flowchart illustrating a control of a condensing temperature and an evaporating temperature of a refrigerating cycle of the air-conditioning apparatus according to Embodiment of the invention. During the operation of the air-conditioning apparatus 100, the controller starts the process at a predetermined control timing (RT0) and detects temperatures of the first temperature sensors 31a and 31b denoted as Twa and Twb, respectively (RT1). Next, the controller determines whether the heating only operation mode is carried out (RT2). If in the heating only operation mode, the average between Twa and Twb is obtained and is denoted as Tw (RT3), and variation of the target value of the condensing temperature of the refrigerant $\Delta CT$ (amount of change of the condensing temperature) is calculated by the formula (9) (RT4). Here, Twhm is a target temperature of the hot water side, kc is a relaxation coefficient and is 0.3, for example, and $\alpha$ is the amount of heat released in the extension piping on the hot water side and is 1 degree C., for example. Further, in the heating only operation, the variation of the target value of the evaporating temperature of the refrigerant $\Delta ET$ is set to 0.

$$\Delta CT = \Delta CT + kc \cdot (Twhm + \alpha - Tw) \quad (9)$$

Next, the controller determines whether the cooling only operation mode is carried out (RT5). If in the cooling only operation mode, the average between Twa and Twb is obtained and is denoted as Tw (RT6), and variation of the target value of the evaporating temperature of the refrigerant $\Delta ET$ (amount of change of the evaporating temperature) is calculated by the formula (10) (RT7). Here, Twcm is a target temperature of the cold water side, ke is a relaxation coefficient and is 0.3, for example, and $\beta$ is the amount of heat received in the extension piping on the cold water side and is 1 degree C., for example. Further, in the cooling only operation mode, variation of the target value of the condensing temperature of the refrigerant $\Delta CT$ is set to 0.

$$\Delta ET = \Delta ET + ke \cdot (Tw - Twcm - \beta) \quad (10)$$

Furthermore, the controller determines whether the cooling and heating mixed operation mode (cooling main operation mode or heating main operation mode) is carried out (RT8). If in the cooling and heating mixed operation mode, the variation of the target value of the condensing temperature of the refrigerant $\Delta CT$ and the variation of the target value of the evaporating temperature of the refrigerant $\Delta ET$ are calculated by formula (11) and (12), respectively (RT9).

$$\Delta CT = \Delta CT + kc \cdot (Twhm + \alpha - Twb) \quad (11)$$

$$\Delta ET = \Delta ET + ke \cdot (Twa - Twcm - \beta) \quad (12)$$

The above calculation is carried out by the first control unit, which constitutes the control device, disposed in the heat medium relay unit 3. Further, the variation of the target value of the condensing temperature of the refrigerant $\Delta CT$ and the variation of the target value of the evaporating temperature of the refrigerant $\Delta ET$ that has been calculated are transmitted to the second control unit disposed in the outdoor unit 1 by wire or wireless (RT10). In addition, in the second control unit in the outdoor unit 1, control values of the condensing temperature and the evaporating temperature—control target values that are set in advance or are calculated by another control algorithm—are each added to $\Delta CT$ and $\Delta ET$ to become control target values that control the refrigeration cycle.

The above process is performed at regular time intervals (RT11) repeatedly, for example. In the control of the condensing temperature and the evaporating temperature, the temperature of the heat medium is used as information. When the flow rate of the pumps 21a and 21b changes, the temperature of the heat medium changes. The control of the condensing temperature and the evaporating temperature need to be performed after the control of the pumps 21a and 21b are stable to a certain extent. Accordingly, the control interval (time) of the condensing temperature and the evaporating temperature needs to be longer than the control interval (time) of the pumps 21a and 21b. For example, if the control interval of the condensing temperature and the evaporating temperature are 1 minute, then the control interval of the pumps 21a and 21b may be, preferably, 3 times or more, such as a value of 3 to 5 minutes. However, it is not limited to the above and may be 2 times.

That is, the control interval of the pumps 21a and 21b is preferably longer than the control interval of the heat medium flow control devices 25a to 25d, and the control interval of the condensing temperature and the evaporating temperature is preferably longer than the control interval of the pumps 21a and 21b.

It should be noted that although a case in which the variation of the control target value of the condensing temperature and the evaporating temperature (amount of change) is calculated and transmitted from the first control unit in the heat medium relay unit 3 to the second control unit in the outdoor unit 1 has been described, the condensing temperature and the evaporating temperature themselves may be calculated and be transmitted from the first control unit in the heat medium relay unit 3 to the second control unit in the outdoor unit 1.

Furthermore, note that the expression "condensing temperature" has been used assuming that a refrigerant that turns into two phase on the high-pressure side, such as R410A, is used. However, when a refrigerant that functions in a supercritical condition on the high-pressure side, such as $CO_2$, is used, in each pressure region that is higher in pressure than the critical point, which is a border of the two-phase condition and the supercritical fluid region, the temperature of the pseudo critical point, which is a point in which the specific heat at constant pressure of the refrigerant becomes highest, may be used instead.

Aforementioned is the method of controlling either or both of the condensing temperature or the evaporating temperature such that the temperature of the heat medium approaches the target temperature. The target temperature of the heat medium may be a fixed value, but further energy saving can be achieved when the target temperature is changed according to the heat load of the indoor space 7.

Several methods of estimating the indoor load and changing the target temperature of the heat medium can be considered. A first method will be described. The heat load of the indoor space 7 is determined by the difference of the indoor temperature (temperature of the indoor space 7) and outdoor temperature (temperature of the outdoor space 6), sunlight, generation of heat in the indoor space 7, and the like. Out of the above, the temperature difference with the outdoor air temperature has the largest influence. While undergoing air conditioning, since the room temperature is kept at a constant value, the heat load can be roughly estimated by the outdoor air temperature. Further, the amount of heat that is supplied to the indoor space 7 from the indoor unit 2 is determined by the temperature difference of the room temperature and the heat medium. Hence, a method in which the target temperature of the heat medium is determined by the outdoor air temperature can be considered. For example, an outdoor air temperature sensor (not illustrated) that detects, as outdoor air temperature, the suction temperature of the air that is to exchange heat with the heat source side refrigerant is provided in the heat source side heat exchanger, and based on the detection temperature of this outdoor air temperature sensor, the target temperature of the heat medium is changed.

Figure 12:
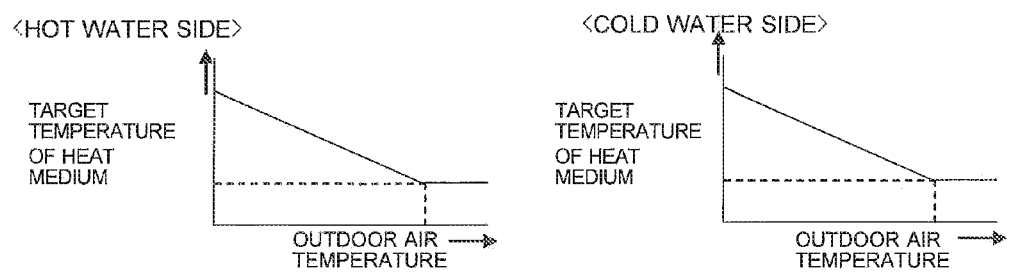
FIG. 12 is a diagram illustrating a relationship between an outdoor air temperature and a target temperature of the heat medium of the air-conditioning apparatus according to Embodiment of the invention.

FIG. 12 is a diagram illustrating a relationship between an outdoor air temperature and a target temperature of the heat medium of the air-conditioning apparatus according to Embodiment of the invention. As illustrated in FIG. 12, for example, the target temperature of the heat medium is defined as a linear function with the outdoor air temperature. In this case, during the heating operation, the target temperature of the heat medium is set to 40 degrees C. when the outdoor air temperature is 10 degrees C., the target temperature of the heat medium is set to 45 degrees C. when the outdoor air temperature is 0 degree C., and the target temperature of the heat medium is set to 50 degrees C. when the outdoor air temperature is −10 degrees C.

A second method will be described. When there is a large difference between the room temperature and the target room temperature, the air-conditioning apparatus 100 is required to supply larger amount of heat to the indoor space 7, and when this temperature difference is small, the air-conditioning apparatus is only required to supply a small amount of heat. That is, the target temperature of the heat medium can be determined based on the temperature difference between the room temperature and the target room temperature. For example, an indoor air temperature sensor (not illustrated) that detects, as indoor temperature, the suction temperature of the air that is to exchange heat with the heat medium is provided in the use side heat exchanger 26a to 26d, and according to the temperature difference between the detection temperature of this indoor air temperature sensor and the target room temperature of the indoor space 7, the target temperature of the heat medium is changed.

Figure 13:
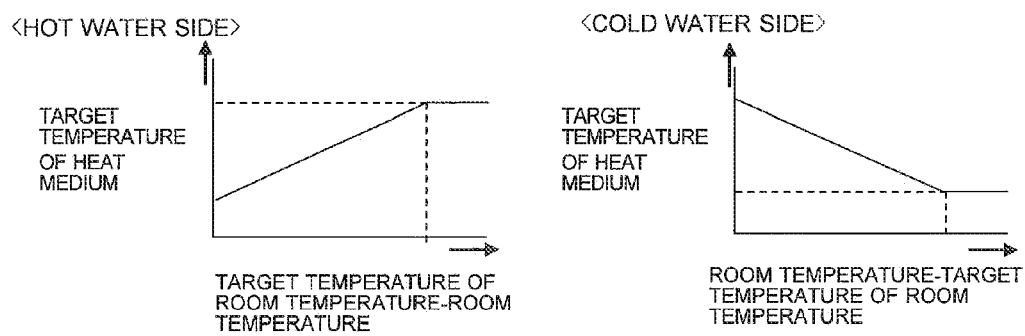
FIG. 13 is a diagram illustrating a relationship between a difference between a room temperature and a target room temperature and the target temperature of the heat medium of the air-conditioning apparatus according to Embodiment of the invention.

FIG. 13 is a diagram illustrating a relationship between a difference between a room temperature and a target room temperature and the target temperature of the heat medium of the air-conditioning apparatus according to Embodiment of the invention. For example, as illustrated in FIG. 13, during heating, the more the value of the subtraction of the room temperature from the target room temperature is large, the temperature of the heat medium is increased, and during cooling, the more the value of the subtraction of the room target temperature from the room temperature is large, the temperature of the heat medium is reduced. In practice, since there is a plurality of indoor units 2, the greatest difference among the room temperature of each indoor unit 2 in the heating operation or cooling operation and the target room temperature may be used to determine the temperature of the heat medium.

As aforedescribed, the air-conditioning apparatus 100 according to the Embodiment of the invention controls the opening degree of the heat medium flow control devices 25 based on the temperatures detected by the first temperature sensor and the second temperature sensor, controls the operating capacities of the pumps 21 such that the opening degree of the controlled heat medium flow control devices 25 approaches the target opening degree, and further controls the refrigeration cycle of the refrigerant circuit such that the temperature of the heat medium whose flow rate has been controlled by the above controls approaches the target temperature. Accordingly, the invention is capable of setting the opening degree such that the loss of flow caused by throttling of the heat flow controller is reduced, as well as approaching the temperature of the heat medium to a target temperature. Hence, the conveyance power can be small, and energy saving can be achieved.

Furthermore, in the Embodiment, each heat medium flow control device 25 is controlled using the temperature differences between the temperature of the first temperature sensors 31a and 31b detecting the temperatures of each heat medium at the outlet of the heat exchangers related to heat medium 15 and the temperatures of the second temperature sensors 34a to 34d detecting the temperature of each heat medium that has flowed out of the use side heat exchangers 26a to 26d. Since the outlet of the heat exchangers related to heat medium 15 and the pipes 5(1) are located in close distance and are provided in the same housing, heat loss is small and the detection temperature at the position of the pipes 5(1) and the detection temperature at the exits of the heat exchangers related to heat medium 15 do not differ much. Therefore, instead of disposing the first temperature sensors 31 at the position of the pipes 5(1), by using each of the first temperature sensor 31 provided for each heat exchanger related to heat medium 15, the number of temperature detecting devices can be reduced, and thus configure the system with low cost.

Furthermore, in the air-conditioning apparatus 100 according to Embodiment, in the case in which only the heating load or cooling load is generated in the use side heat exchangers 26, the corresponding first heat medium flow switching devices 22 and the corresponding second heat medium flow switching devices 23 are controlled so as to have a medium opening degree, such that the heat medium flows into both of the heat exchanger related to heat medium 15a and the heat exchanger related to heat medium 15b. Consequently, since both the heat exchanger related to heat medium 15a and the heat exchanger related to heat medium 15b can be used for the heating operation or the cooling operation, the heat transfer area can be increased, and accordingly the heating operation or the cooling operation can be efficiently performed.

In addition, in the case in which the heating load and the cooling load simultaneously occur in the use side heat exchangers 26, the first heat medium flow switching device 22 and the second heat medium flow switching device 23 corresponding to the use side heat exchanger 26 which performs the heating operation are switched to the passage connected to the heat exchanger related to heat medium 15b for heating, and the first heat medium flow switching device 22 and the second heat medium flow switching device 23 corresponding to the use side heat exchanger 26 which performs the cooling operation are switched to the passage connected to the heat exchanger related to heat medium 15a for cooling, so that the heating operation or cooling operation can be freely performed in each indoor unit 2.

Moreover, in the air-conditioning apparatus 100, the outdoor unit 1 and the heat medium relay unit 3 are connected with refrigerant pipes 4 thorough which the heat source side refrigerant flows. The heat medium relay unit 3 and each indoor unit 2 are connected with pipes 5 through which the heat medium flows. Cooling energy or heating energy generated in the outdoor unit 1 exchanges heat in the heat medium relay unit 3, and is delivered to the indoor units 2. Accordingly, the refrigerant does not circulate in or near the indoor units 2, and risk of the refrigerant leaking into the room and the like can be eliminated. Hence, safety is increased.

Furthermore, the heat source side refrigerant and the heat medium exchange heat in the heat medium relay unit 3 that is a separate housing to the outdoor unit 1. Accordingly, the pipes 5 in which the heat medium circulates can be shortened and small conveyance power is required, and thus, safety can be increased and energy can be saved.

The heat medium relay unit 3 and each indoor unit 2 are connected with two pipes 5. Further, passages between each use side heat exchanger 26 in each indoor unit 2 and each heat exchanger related to heat medium 15 housed in the heat medium relay unit 3 are switched according to the operation mode. Because of this, the cooling or heating can be selected per each indoor unit 2 with the connection of the two pipes 5, and, thus, installation work of the pipes in which the heat medium circulates can be facilitated and can be carried out safely.

The outdoor unit 1 and each heat medium relay unit 3 are connected with two refrigerant pipes 4. Because of this, installation work of the refrigerant pipes 4 can be facilitated and can be carried out safely.

Furthermore, the pump 21 is provided per each heat exchanger related to heat medium 15. Because of this, the pump 21 does not need to be provided per each indoor unit 2, and thus an air-conditioning apparatus configured at low cost can be obtained. In addition, noise generated by the pumps can be reduced.

The plurality of use side heat exchangers 26 is each connected in parallel to the heat exchanger related to heat mediums 15 through corresponding first heat medium flow switching devices 22 and second heat medium flow switching devices 23. Because of this, even when a plurality of indoor units 2 are provided, the heat medium that has heat exchanged does not flow into the passage in which the heat medium before heat exchange flows, and thus each indoor unit 2 can exert its maximum capacity. Hence, waste of energy can be reduced and energy saving can be achieved.

Figure 14:
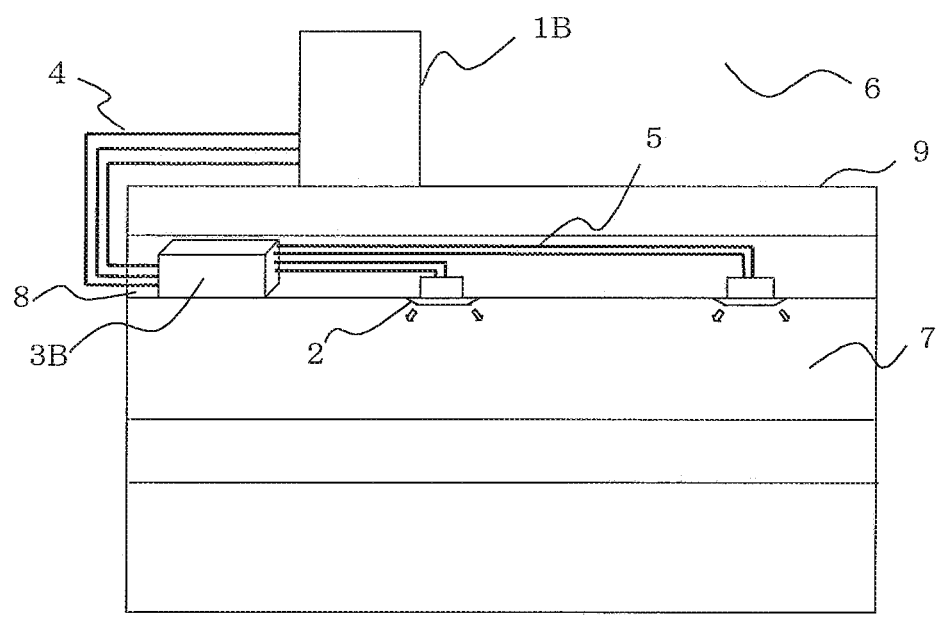
FIG. 14 is a schematic diagram illustrating an exemplary installation of an air-conditioning apparatus according to Embodiment of the invention.
Figure 15:
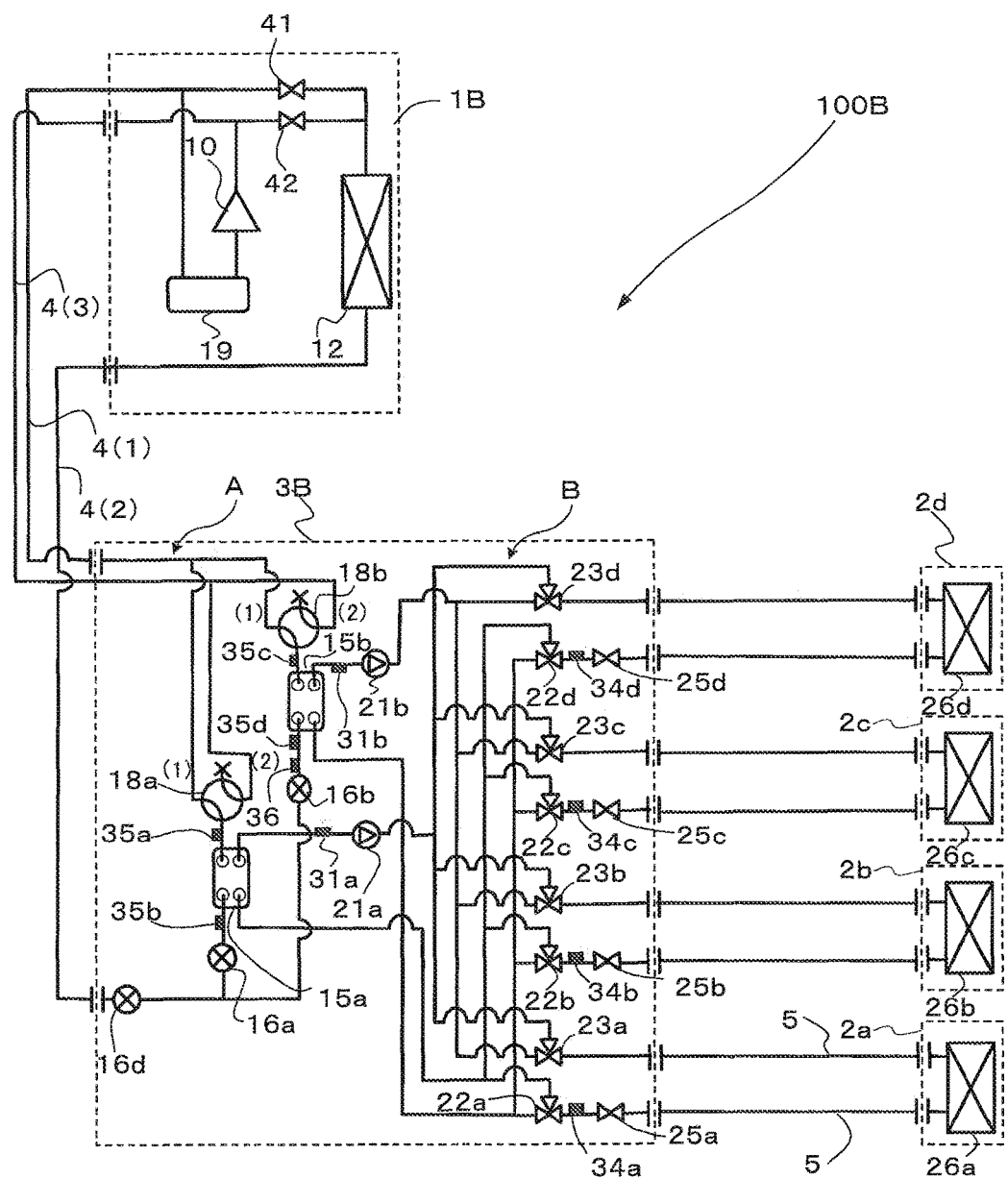
FIG. 15 is another schematic circuit diagram illustrating an exemplary circuit configuration of the air-conditioning apparatus according to Embodiment of the invention.

Furthermore, the air-conditioning apparatus according to Embodiment (hereinafter referred as air-conditioning apparatus 100B) may be configured such that the outdoor unit (hereinafter, referred as outdoor unit 1B) and the heat medium relay unit (hereinafter, referred as heat medium relay unit 3B) are connected with three refrigerant pipes 4 (refrigerant pipe 4(1), refrigerant pipe 4(2), refrigerant pipe 4(3)) as shown in FIG. 15. FIG. 14 illustrates a diagram of an exemplary installation of the air-conditioning apparatus 100B. Specifically, the air-conditioning apparatus 100B also allows all of the indoor units 2 to perform the same operation and allows each of the indoor units 2 to perform different operations. In addition, in the refrigerant pipe 4(2) in the heat medium relay unit 3B, an expansion device 16b (for example, an electronic expansion valve) is provided for the merging high-pressure liquid during cooling main operation mode.

The general configuration of the air-conditioning apparatus 100B is the same as the air-conditioning apparatus 100 except for the outdoor unit 1B and the heat medium relay unit 3B. The outdoor unit 1B includes a compressor 10, a heat source side heat exchanger 12, an accumulator 19, two flow switching units (flow switching unit 41 and flow switching unit 42). The flow switching unit 41 and the flow switching unit 42 constitute the first refrigerant flow switching device. In the air-conditioning apparatus 100, a case in which the first refrigerant flow switching device is a four-way valve has been described, but as shown in FIG. 15, the first refrigerant switching device may be a combination of a plurality of two-way valves.

In the heat medium relay unit 3B, the refrigerant pipe, which is branched from the refrigerant pipe 4(2) having the on-off device 17 and is connected to the second refrigerant switching device 18b, is not provided and instead the on-off devices 18a (1) and 18b (1) are connected to the refrigerant pipe 4(1), and the on-off devices 18*a* (2) and 18*b* (2) are connected to the refrigerant pipe 4(3). Further, the expansion device 16*d* is provided and is connected to the refrigerant pipe 4(2).

The refrigerant pipe 4(3) connects the discharge pipe of the compressor 10 to the heat medium relay unit 3B. The two flow switching units each include, for example, a two-way valve and are configured to open or close the refrigerant pipes 4. The flow switching unit 41 is provided between the suction pipe of the compressor 10 and the heat source side heat exchanger 12, and the control of its on-off switches the refrigerant flow of the heat source. The flow switching unit 42 is provided between the discharge pipe of the compressor 10 and the heat source side heat exchanger 12, and the control of its on-off switches the refrigerant flow of the heat source.

Hereinafter, with reference to FIG. 15, each operation mode carried out by the air-conditioning apparatus 100 will be described. Note that since the heat medium flow is the same as the air-conditioning apparatus 100, description will be omitted.

[Cooling Only Operation Mode]

In this cooling only operation mode, flow switching unit 41 is closed, and the flow switching unit 42 is opened.

A low-temperature low-pressure refrigerant is compressed by the compressor 10 and is discharged as a high-temperature high-pressure gas refrigerant therefrom. All of the high-temperature high-pressure gas refrigerant discharged from the compressor 10 flows through the flow switching unit 42 into the heat source side heat exchanger 12. Then, the refrigerant is condensed into a high-pressure liquid refrigerant while transferring heat to outdoor air in the heat source side heat exchanger 12. The high-pressure liquid refrigerant, which has flowed out of the heat source side heat exchanger 12, passes through the refrigerant pipe 4 (2) and flows into the heat medium relay unit 3B. The high-pressure liquid refrigerant flowing into the heat medium relay unit 3B is branched after passing through a fully opened expansion device 16 *d* and is expanded into a low-temperature low-pressure two-phase refrigerant by an expansion device 16*a* and an expansion device 16*b*.

This two-phase refrigerant flows into each of the heat exchanger related to heat medium 15*a* and the heat exchanger related to heat medium 15*b*, functioning as evaporators, removes heat from the heat medium circulating in a heat medium cycle B to cool the heat medium, and thus turns into a low-temperature low-pressure gas refrigerant. The gas refrigerant, which has flowed out of each of the heat exchanger related to heat medium 15*a* and the heat exchanger related to heat medium 15*b*, merges and flows out of the heat medium relay unit 3B through the corresponding one of a second refrigerant flow switching device 18*a* and a second refrigerant flow switching device 18*b*, passes through the refrigerant pipe 4 (1), and again flows into the outdoor unit 1. The refrigerant flowing into the outdoor unit 1B, flow through the accumulator 19 and again is sucked into the compressor 10.

[Heating Only Operation Mode]

In this heating only operation mode, flow switching unit 41 is opened, and the flow switching unit 42 is closed.

A low-temperature low-pressure refrigerant is compressed by the compressor 10 and is discharged as a high-temperature high-pressure gas refrigerant therefrom. All of the high-temperature high-pressure gas refrigerant discharged from the compressor 10 flows through the refrigerant pipe 4 (3) and out of the outdoor unit 1B. The high-temperature high-pressure gas refrigerant, which has flowed out of the outdoor unit 1B, passes through the refrigerant pipe 4 (3) and flows into the heat medium relay unit 3B. The high-temperature high-pressure gas refrigerant that has flowed into to heat medium relay unit 3B is branched, passes through each of the second refrigerant flow switching device 18*a* and the second refrigerant flow switching device 18*b*, and flows into the corresponding one of the heat exchanger related to heat medium 15*a* and the heat exchanger related to heat medium 15*b*.

The high-temperature high-pressure gas refrigerant flowing into each of the heat exchanger related to heat medium 15*a* and the heat exchanger related to heat medium 15*b* is condensed into a high-pressure liquid refrigerant while transferring heat to the heat medium circulating in the heat medium cycle B. The liquid refrigerant flowing out of the heat exchanger related to heat medium 15*a* and that flowing out of the heat exchanger related to heat medium 15*b* are expanded into a low-temperature low-pressure, two-phase refrigerant through the expansion device 16*a* and the expansion device 16*b*. This two-phase refrigerant passes through the fully-opened expansion device 16*d*, flows out of the heat medium relay unit 3B, passes through the refrigerant pipe 4 (2), and again flows into the outdoor unit 1B.

The refrigerant flowing into the outdoor unit 1B flows into the heat source side heat exchanger 12, functioning as an evaporator. Then, the refrigerant flowing into the heat source side heat exchanger 12 removes heat from the outdoor air in the heat source side heat exchanger 12 and thus turns into a low-temperature low-pressure gas refrigerant. The low-temperature low-pressure gas refrigerant flowing out of the heat source side heat exchanger 12 passes through the flow switching unit 41 and the accumulator 19 and is again sucked into the compressor 10.

[Cooling Main Operation Mode]

The cooling main operation mode will be described with respect to a case in which a cooling load is generated in the use side heat exchanger 26*a* and a heating load is generated in the use side heat exchanger 26*b*. Note that in the cooling main operation mode, flow switching unit 41 is closed, and the flow switching unit 42 is opened.

A low-temperature low-pressure refrigerant is compressed by the compressor 10 and is discharged as a high-temperature high-pressure gas refrigerant therefrom. A portion of the high-temperature high-pressure gas refrigerant discharged from the compressor 10 flows through the flow switching unit 42 into the heat source side heat exchanger 12. Then, the refrigerant is condensed into a high-pressure liquid refrigerant while transferring heat to outdoor air in the heat source side heat exchanger 12. The liquid refrigerant, which has flowed out of the heat source side heat exchanger 12, passes through the refrigerant pipe 4 (2), flows into the heat medium relay unit 3B, and is slightly decompressed to medium pressure by the expansion device 16*d*. Meanwhile, the other high-temperature high-pressure gas refrigerant passes through the refrigerant pipe 4 (3) and flows into the heat medium relay unit 3B. The high-temperature high-pressure refrigerant flowing into the heat medium relay unit 3B passes through the second refrigerant flow switching device 18*b*(2) and flows into the heat exchanger related to heat medium 15*b*, functioning as a condenser.

The high-temperature high-pressure gas refrigerant that has flowed into the heat transfer medium heat exchanger 15*b* is condensed and liquefied while transferring heat to the heat transfer medium circulating in the heat transfer medium circulating circuit B, and it becomes the liquid refrigerant. The liquid refrigerant flowing out of the heat exchanger related to heat medium 15*b* is slightly decompressed to medium pressure by the expansion device 16b and is merged with the liquid refrigerant that has been decompressed to medium pressure by the expansion device 16d. The merged refrigerant is expanded by the expansion device 16a turning into a low-pressure two-phase refrigerant and flows into the heat exchanger related to heat medium 15a functioning as an evaporator. The low-pressure two-phase refrigerant flowing into the heat exchanger related to heat medium 15a removes heat from the heat medium circulating in the heat medium cycle B to cool the heat medium, and thus turns into a low-pressure gas refrigerant. This gas refrigerant flows out of the heat exchanger related to heat medium 15a, flows through the second refrigerant flow switching device 18a out of the heat medium relay unit 3, passes through the refrigerant pipe 4 (1), and again flows into the outdoor unit 1. The refrigerant flowing into the outdoor unit 1B, flow through the accumulator 19 and again is sucked into the compressor 10.

[Heating Main Operation Mode]

The heating main operation mode will be described herein with respect to a case in which a heating load is generated in the use side heat exchanger 26a and a cooling load is generated in the use side heat exchanger 26b. Note that in the heating main operation mode, flow switching unit 41 is opened, and the flow switching unit 42 is closed.

A low-temperature low-pressure refrigerant is compressed by the compressor 10 and is discharged as a high-temperature high-pressure gas refrigerant therefrom. All of the high-temperature high-pressure gas refrigerant discharged from the compressor 10 flows through the refrigerant pipe 4 (3) and out of the outdoor unit 1B. The high-temperature high-pressure gas refrigerant, which has flowed out of the outdoor unit 1B, passes through the refrigerant pipe 4 (3) and flows into the heat medium relay unit 3B. The high-temperature high-pressure gas refrigerant flowing into the heat medium relay unit 3B passes through the second refrigerant flow switching device 18b and flows into the heat exchanger related to heat medium 15b, functioning as a condenser.

The gas refrigerant that has flowed into the heat exchanger related to heat medium 15b is condensed and liquefied while transferring heat to the heat medium circulating in the heat medium cycle B, and turns into a liquid refrigerant. The liquid refrigerant flowing out of the heat exchanger related to heat medium 15b is expanded into a low-pressure two-phase refrigerant by the expansion device 16b. This low-pressure two-phase refrigerant is branched into two, and one portion flows through the expansion device 16a into the heat exchanger related to heat medium 15a, functioning as an evaporator. The low-pressure two-phase refrigerant flowing into the heat exchanger related to heat medium 15a removes heat from the heat medium circulating in the heat medium cycle B to evaporate, thus cooling the heat medium. This low-pressure two-phase refrigerant flows out of the heat exchanger related to heat medium 15a, turns into a low-temperature low-pressure gas refrigerant, passes through the second refrigerant flow switching device 18a(1), flows out of the heat medium relay unit 3B, passes through the refrigerant pipe 4(1), and again flows into the outdoor unit 1. The two-phase low-pressure refrigerant, which had been branched after flowing thorough the expansion device 16b, passes through the fully-opened expansion device 16d, flows out of the heat medium relay unit 3B, passes through the refrigerant pipe 4 (2), and flows into the outdoor unit 1B.

The refrigerant flowing through the refrigerant pipe 4(2) and into the outdoor unit 1B flows into the heat source side heat exchanger 12, functioning as an evaporator. Then, the refrigerant flowing into the heat source side heat exchanger 12 removes heat from the outdoor air in the heat source side heat exchanger 12 and thus turns into a low-temperature low-pressure gas refrigerant. The low-temperature low-pressure gas refrigerant that has flowed out of the heat source side heat exchanger 12 flows through the flow switching unit 41, merges with the low-temperature low-pressure gas refrigerant that has flowed into the outdoor unit 1B through the refrigerant pipe 4(1), flows through the accumulator 19, and again is sucked into the compressor 10.

Furthermore, each of the first heat medium flow switching devices 22 and the second heat medium flow switching devices 23 described in Embodiment may be any of the sort as long as they can switch passages, for example, a three-way valve capable of switching between three passages or a combination of two on-off valves and the like switching between two passages. Alternatively, components such as stepping-motor-driven mixing valve capable of changing flow rates of three passages or electronic expansion valves capable of changing flow rates of two passages may be used in combination as each of the first heat medium flow switching devices 22 and the second heat medium flow switching devices 23. In this case, water hammer caused when a passage is suddenly opened or closed can be prevented. Furthermore, while Embodiment has been described with respect to the case in which the heat medium flow control devices 25 each include a stepping-motor-driven two-way valve, each of the heat medium flow control devices 25 may include a control valve having three passages and the valve may be disposed with a bypass pipe that bypasses the corresponding use side heat exchanger 26.

Furthermore, as regards each of the heat medium flow control device 25, a stepping-motor-driven type that is capable of controlling a flow rate in the passage may be used. Alternatively, a two-way valve or a three-way valve whose one end is closed may be used. Alternatively, as regards each of the heat medium flow control device 25, a component, such as an on-off valve, which is capable of opening or closing a two-way passage, may be used while ON and OFF operations are repeated to control an average flow rate.

Furthermore, while the case in which each second refrigerant flow switching device 18 is a four-way valve has been described, the device is not limited to this type. The device may be configured such that the refrigerant flows in the same manner using a plurality of two-way flow switching valves or three-way flow switching valves.

While the air-conditioning apparatus 100 according to Embodiment has been described with respect to the case in which the apparatus can perform the cooling and heating mixed operation, the apparatus is not limited to the case. Even in an apparatus that is configured by a single heat exchanger related to heat medium 15 and a single expansion device 16 that are connected to a plurality of parallel use side heat exchangers 26 and heat medium flow control devices 25, and is capable of carrying out only a cooling operation or a heating operation, the same advantages can be obtained.

In addition, it is needless to say that the same holds true for the case in which a single use side heat exchanger 26 and a single heat medium flow control device 25 are connected. Moreover, obviously, no problem will arise even if the heat exchanger related to heat medium 15 and the expansion device 16 acting in the same manner are arranged in plural numbers. Furthermore, while the case in which the heat medium flow control devices 25 are arranged in the heat medium relay unit 3 has been described, the arrangement is not limited to this case. Each heat medium flow control device 25 may be disposed in the indoor unit 2. The heat medium relay unit 3 may be separated from the indoor unit 2.

As regards the heat source side refrigerant, a single refrigerant, such as R-22 or R-134a, a near-azeotropic refrigerant mixture, such as R-410A or R-404A, a non-azeotropic refrigerant mixture, such as R-407C, a refrigerant, such as $CF_3CF=CH_2$, containing a double bond in its chemical formula and having a relatively low global warming potential, a mixture containing the refrigerant, or a natural refrigerant, such as $CO_2$ or propane, can be used. While the heat exchanger related to heat medium 15a or the heat exchanger related to heat medium 15b is operating for heating, a refrigerant that typically changes between two phases is condensed and liquefied and a refrigerant that turns into a supercritical state, such as $CO_2$, is cooled in the supercritical state. As for the rest, either of the refrigerant acts in the same manner and offers the same advantages.

As regards the heat medium, for example, brine (antifreeze), water, a mixed solution of brine and water, or a mixed solution of water and an additive with high anticorrosive effect can be used. In the air-conditioning apparatus 100, therefore, even if the heat medium leaks into the indoor space 7 through the indoor unit 2, because the heat medium used is highly safe, contribution to improvement of safety can be made.

While Embodiment has been described with respect to the case in which the air-conditioning apparatus 100 includes the accumulator 19, the accumulator 19 may be omitted. In addition, while Embodiment has been described with respect to the case in which the air-conditioning apparatus 100 includes the check valves 13a to 13d, these components are not essential parts. It is therefore needless to say that even if the accumulator 19 and the check valves 13a to 13d are omitted, the air-conditioning apparatus will act in the same manner and offer the same advantages.

Typically, a heat source side heat exchanger 12 and a use side heat exchanger 26 are provided with a blower in which a current of air often facilitates condensation or evaporation. The structure is not limited to this case. For example, a heat exchanger, such as a panel heater, using radiation can be used as the use side heat exchanger 26 and a water-cooled heat exchanger, which transfers heat using water or antifreeze, can be used as the heat source side heat exchanger 12. In other words, as long as the heat exchanger is configured to be capable of transferring heat or removing heat, any type of heat exchanger can be used as each of the heat source side heat exchanger 12 and the use side heat exchanger 26. Moreover, the number of the use side heat exchanger 26 is not particularly limited.

Embodiment has been described with respect to the case in which a single first heat medium flow switching device 22, a single second heat medium flow switching device 23, and a single heat medium flow control device 25 are connected to each use side heat exchanger 26. The arrangement is not limited to this case. A plurality of devices 22, a plurality of devices 23, and a plurality of devices 25 may be connected to each use side heat exchanger 26. In this case, the first heat medium flow switching devices, the second heat medium flow switching devices, and the heat medium flow control devices connected to the same use side heat exchanger 26 may be operated in the same manner.

Furthermore, Embodiment has been described with respect to the case in which the number of heat exchangers related to heat medium 15 is two. As a matter of course, the arrangement is not limited to this case. As long as the heat exchanger related to heat medium 15 is configured to be capable of cooling or/and heating the heat medium, the number of heat exchangers related to heat medium 15 arranged is not limited.

Furthermore, each of the number of pumps 21a and that of pumps 21b is not limited to one. A plurality of pumps having a small capacity may be used in parallel.

As described above, the air-conditioning apparatus 100 according to Embodiment can perform a safe and high energy-saving operation by controlling the heat medium flow switching devices (the first heat medium flow switching devices 22 and the second heat medium flow switching devices 23), the heat medium flow control devices 25, and the pumps 21 for the heat medium.

REFERENCE SIGNS LIST 1 outdoor unit; 1B outdoor unit; 2 indoor unit; 2a indoor unit; 2b indoor unit; 2c indoor unit; 2d indoor unit; 3 heat medium relay unit; 3B heat medium relay unit; 3a main heat medium relay unit; 3b sub heat medium relay unit; 4 refrigerant pipe; 4a first connecting pipe; 4b second connecting pipe; 5 pipe; 6 outdoor space; 7 indoor space; 8 space; 9 structure; 10 compressor; 11 first refrigerant flow switching device; 12 heat source side heat exchanger; 13a check valve; 13b check valve; 13c check valve; 13d check valve; 14 gas-liquid separator; 15 heat exchanger related to heat medium; 15a heat exchanger related to heat medium; 15b heat exchanger related to heat medium; 16 expansion device; 16an expansion device; 16b expansion device; 16c expansion device; 17 on-off device; 17a on-off device; 17b on-off device; 18 second refrigerant flow switching device; 18a second refrigerant flow switching device; 18b second refrigerant flow switching device; 19 accumulator; 21 pump; 21a pump; 21b pump; 22 first heat medium flow switching device; 22a first heat medium flow switching device; 22b first heat medium flow switching device; 22c first heat medium flow switching device; 22d first heat medium flow switching device; 23 second heat medium flow switching device; 23a second heat medium flow switching device; 23b second heat medium flow switching device; 23c second heat medium flow switching device; 23d second heat medium flow switching device; 25 heat medium flow control device; 25a heat medium flow control device; 25b heat medium flow control device; 25c heat medium flow control device; 25d heat medium flow control device; 26 use side heat exchanger; 26a use side heat exchanger; 26b use side heat exchanger; 26c use side heat exchanger; 26d use side heat exchanger; 31 first temperature sensor; 31a first temperature sensor; 31b first temperature sensor; 34 second temperature sensor; 34a second temperature sensor; 34b second temperature sensor; 34c second temperature sensor; 34d second temperature sensor; 35 third temperature sensor; 35a third temperature sensor; 35b third temperature sensor; 35c third temperature sensor; 35d third temperature sensor; 36 pressure sensor; 41 flow switching unit; 42 flow switching unit; 100 air-conditioning apparatus; 100A air-conditioning apparatus; 100B air-conditioning apparatus; A refrigerant cycle; and B heat medium cycle.

The invention claimed is:
1. An air-conditioning apparatus in which
a compressor, a heat source side heat exchanger, expansion devices, and heat exchangers related to heat medium connect to form a refrigerant circuit for circulating a heat source side refrigerant, and pumps, a plurality of use side heat exchangers, and the heat exchangers related to heat medium connect to form a plurality of heat medium cycles circulating a heat medium, the air-conditioning apparatus, comprising:
a plurality of heat medium flow control devices for controlling a flow rate of the heat medium that circulates in each of the use side heat exchangers, respectively;
a first temperature sensor, which is positioned at a point in a passage between each of the heat exchangers related to heat medium and an inlet side of the use side heat exchangers, detecting a temperature of the heat medium;
a second temperature sensor, which is positioned at a point in a passage between each outlet side of the use side heat exchangers and the heat exchangers related to heat medium, detecting a temperature of the heat medium; and
a controller configured to control at least the plurality of heat medium flow control devices, the pumps, the compressor, and the expansion devices,
the controller configured to:
execute a heat medium flow control device control that controls an opening degree of the heat medium flow control devices,
execute a pump control that controls each operation capacity of the pumps, based upon a relationship of a maximum opening degree among the plurality of heat medium flow control devices to a predetermined target opening degree, and
execute a refrigeration-cycle control of the refrigerant circuit such that the detection temperature of the first temperature sensor approaches a target temperature of the heat medium, whose wherein the flow rate is controlled by the heat medium flow control device control and the pump control, by setting a control target value of at least one of a condensing temperature and an evaporating temperature of the heat source side refrigerant, or a control target value of at least one of an amount of change of the condensing temperature and an amount of change of the evaporating temperature of the heat source side refrigerant based on the detection temperature of the heat medium by the first temperature sensor.

2. The air-conditioning apparatus of claim 1, wherein
a control interval of the pump control is longer than a control interval of the heat medium flow control device control, and
a control interval of the refrigeration-cycle control is longer than the control interval of the pump control.

3. The air-conditioning apparatus of claim 1, wherein
a control interval of the pump control is 3 times or more longer than a control interval of the heat medium flow control device control, and
a control interval of the refrigeration-cycle control is 3 times or more longer than the control interval of the pump control.

4. The air-conditioning apparatus of claim 1, wherein
the controller is configured to control the opening degree of each of the heat medium flow control devices based on a difference between a detection temperature difference between the first temperature sensor and the second temperature sensor and a target temperature difference of each of the use side heat exchangers to the target temperature thereof so as to control the flow rate of the heat medium circulating in the use side heat exchanger.

5. The air-conditioning apparatus of claim 4, wherein
the controller is configured to set a control gain of each of the heat medium flow control devices based on a difference between an opening area at a current opening degree of the heat medium flow control devices or a value corresponding to the opening area and an opening area predicted value of the heat medium flow control devices or a predicted value of the value corresponding to the opening area at the time when the detection temperature difference becomes the target temperature difference.

6. The air-conditioning apparatus of claim 5, wherein
the controller is configured to obtain the opening area predicted value or the predicted value of the value corresponding to the opening area based on the detection temperature difference, the target temperature difference, and the opening area at the current opening degree or the value corresponding the opening area.

7. The air-conditioning apparatus of claim 5, wherein
the controller is configured to change the control gain of the heat medium flow control device continuously or in steps.

8. The air-conditioning apparatus of claim 1, wherein
the controller is configured to control operating capacities of the pumps such that the opening degree or a value corresponding to the opening degree of the heat medium flow control devices approaches a target opening degree based on the opening degree or the value corresponding to the opening degree of the heat medium flow control devices that is controlled by the heat medium flow control device control.

9. The air-conditioning apparatus of claim 8, wherein
the target opening degree is set in advance based on an opening degree or the value corresponding to the opening degree, which are corresponding to the maximum opening degree of the heat medium flow control device, and
the operating capacities of the pumps are controlled such that the maximum value or the mean value of the opening degree or the value corresponding to the opening degree of the heat medium flow control devices approaches the target opening degree or the value corresponding to the opening degree.

10. The air-conditioning apparatus of claim 8, wherein
the air-conditioning apparatus is capable of carrying out:
a heating only operation mode that heats the heat medium by allowing a high-temperature high-pressure heat source side refrigerant discharged from the compressor to flow through all of the heat exchangers related to heat medium;
a cooling only operation mode that cools the heat medium by allowing a low-temperature low-pressure heat source side refrigerant discharged from the compressor to flow through all of the heat exchangers related to heat medium; and
a cooling and heating mixed operation mode that heats the heat medium by allowing the high-temperature high-pressure heat source side refrigerant discharged from the compressor to flow through one or some of the heat exchangers related to heat medium, and cools the heat medium by allowing a low-temperature low-pressure heat source side refrigerant to flow through one or some of the other heat exchangers related to heat medium,
in the cooling and heating mixed operation mode the pumps are separated into a heating side pump corresponding to the heat exchanger related to heat medium that heats the heat medium and a cooling side pump corresponding to the heat exchanger related to heat medium that cools the heat medium, the operating capacity of the heating side pump is controlled such that the maximum value or the mean value of the opening degree or the value corresponding to the opening degree of the heat medium flow control devices corresponding to the use side heat exchanger in heating operation approaches the target opening degree, and the operating capacity of the cooling side pump is controlled such that the maximum value or the mean value of the opening degree or the value corresponding to the opening degree of the heat medium flow control devices corresponding to the use side heat exchanger in cooling operation approaches the target opening degree.

11. The air-conditioning apparatus of claim 8, wherein the controller has a capacity code, which is information on the amount of each heat exchange of the use side heat exchangers, set in advance, changes the operating capacity of the heating side pump based on the total value of the capacity codes of the use side heat exchangers that are in heating operation, and changes the operating capacity of the cooling side pump based on the total value of the capacity codes of the use side heat exchangers that are in cooling operation.

12. The air-conditioning apparatus of claim 1, further comprising an outdoor air temperature sensor that detects a suction temperature of air that is to exchange heat with the heat source side refrigerant being provided in the heat source side heat exchanger, wherein the target temperature of the heat medium is changed based on the detection temperature of the outdoor air temperature sensor.

13. The air-conditioning apparatus of claim 1, further comprising an indoor air temperature sensor that detects a suction temperature of air that is to exchange heat with the heat medium, being provided in each of the use side heat exchangers, wherein the target temperature of the heat medium is changed based on the difference between the detection temperature of the indoor air temperature sensor and a target temperature of the conditioned space.

14. The air-conditioning apparatus of claim 1, wherein the compressor and the heat source side heat exchanger are housed in an outdoor unit, the expansion devices, the heat exchangers related to heat medium, and the pumps are housed in a heat medium relay unit, each use side heat exchanger is housed in an indoor unit, and the outdoor unit, the heat medium relay unit, and the indoor unit are constitutable in separate housings and are installable at separate places.

15. The air-conditioning apparatus of claim 1, wherein the compressor and the heat source side heat exchanger are housed in an outdoor unit, the expansion devices, the heat exchangers related to heat medium, and the pumps are housed in a heat medium relay unit, the outdoor unit and the heat medium relay unit are constitutable in separate housings and are installable at separate places, the controller includes:

a first control unit that is configured to control at least the heat medium flow control device, the pumps, and the expansion devices, the first control unit being disposed inside or at a position near the heat medium relay unit; and a second control unit that is configured to control at least the heat source side heat exchanger, the second control unit being disposed inside or at a position near the outdoor unit, the air-conditioning apparatus wherein the first control unit and the second control unit are connected with each other by wireless or wire, and the first control unit transmits the control target value, which is either or both of the condensing temperature and the evaporating temperature of the heat source side refrigerant or the control target value, which is either or both of amount of change of the condensing temperature and an amount of change of the evaporating temperature, to the second control unit as a control signal.

16. The air-conditioning apparatus of claim 1, wherein the heat medium flow control device is housed in a heat medium relay unit.

17. The air-conditioning apparatus of claim 1, wherein the expansion devices, the heat exchangers related to heat medium, and the pumps are housed in a heat medium relay unit, the heat medium flow control devices are disposed in separate housing to the housing of the heat medium relay unit, the controller further includes:

a first control unit that is configured to control the heat medium flow control devices, the pumps, and the expansion devices, the first control unit being disposed inside or at a position neat the heat medium relay unit; and a third control unit disposed inside or at a position near a housing separate to the housing of the heat medium relay unit, wherein the first control unit and the third control unit are connected with each other by wireless or wire, and the third control unit transmits information, which is the opening degree or the opening area of the heat medium flow control devices, to the first control unit.

18. The air-conditioning apparatus of claim 1, wherein the first temperature sensor and the second temperature sensor are housed in a heat medium relay unit.

* * * * *